US012699536B2

(12) United States Patent
    Hyun et al.

(10) Patent No.:     US 12,699,536 B2
(45) **Date of Patent:       \*Aug. 4, 2026**

(54) METHOD AND APPARATUS FOR PROVIDING LOCK-SCREEN

(71) Applicant: Samsung Electronics Co., Ltd., Suwon-si (KR)

(72) Inventors: Juho Hyun, Suwon-si (KR); Sung-wook Byun, Seoul (KR); Haksoon Im, Suwon-si (KR)

(73) Assignee: Samsung Electronics Co., Ltd., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/490,316

(22) Filed: Oct. 19, 2023

(65) Prior Publication Data

US 2024/0069844 A1      Feb. 29, 2024

Related U.S. Application Data

(63) Continuation of application No. 17/987,315, filed on Nov. 15, 2022, now Pat. No. 11,797,249, which is a continuation of application No. 16/855,481, filed on Apr. 22, 2020, now abandoned, which is a
(Continued)

(30) Foreign Application Priority Data

Sep. 11, 2014     (KR) ........................ 10-2014-0120005

(51) Int. Cl.
    *G06F 3/14*        (2006.01)
    *G06F 3/0484*      (2022.01)

(52) U.S. Cl.
    CPC .............. *G06F 3/14* (2013.01); *G06F 3/0484* (2013.01); *G09G 2330/022* (2013.01); *G09G 2354/00* (2013.01); *G09G 2358/00* (2013.01)

(58) Field of Classification Search
    None
    See application file for complete search history.

(56) References Cited

U.S. PATENT DOCUMENTS

| | | | | | |
|---|---|---|---|---|---|
| 9,083,814 | B2 * | 7/2015 | Lee | .......................... | H04M 1/67 |
| 10,635,371 | B2 * | 4/2020 | Hyun | ........................ | G06F 3/14 |
| 11,797,249 | B2 * | 10/2023 | Hyun | .................... | G06F 3/0484 |

(Continued)

FOREIGN PATENT DOCUMENTS

| | | |
|---|---|---|
| KR | 10-2011-0114873 A | 10/2011 |
| KR | 10-2012-0033515 A | 4/2012 |

(Continued)

OTHER PUBLICATIONS

Korean Office Action dated Nov. 14, 2020, issued in Korean Application No. 10-2014-0120005.

*Primary Examiner* — Ifedayo B Iluyomade

(74) *Attorney, Agent, or Firm* — Jefferson IP Law, LLP

(57)                    ABSTRACT

A method and an apparatus for providing a lock-screen are provided. The method includes turning off a display unit, configuring content for the lock-screen in response to the turning off of the display unit, receiving a user interaction, based on at least one button, turning on the display unit in response to the user interaction, and displaying the lock-screen that is changed based on the content configured to correspond to the user interaction when the display unit is turned on.

20 Claims, 13 Drawing Sheets

Related U.S. Application Data continuation of application No. 14/844,446, filed on Sep. 3, 2015, now Pat. No. 10,635,371.

(56) References Cited

U.S. PATENT DOCUMENTS

| | | | |
|---|---|---|---|
| 2010/0075649 A1 | 3/2010 | Teng | |
| 2011/0256848 A1 | 10/2011 | Bok et al. | |
| 2012/0084691 A1 | 4/2012 | Yun | |
| 2012/0127105 A1 | 5/2012 | Kim | |
| 2013/0102273 A1 | 4/2013 | Jung et al. | |
| 2013/0102279 A1 | 4/2013 | Lee et al. | |
| 2013/0298024 A1* | 11/2013 | Rhee | H04M 1/67 |
| | | | 715/716 |
| 2014/0344151 A1 | 11/2014 | Soundararajan et al. | |
| 2015/0045000 A1 | 2/2015 | Kim et al. | |
| 2015/0138101 A1* | 5/2015 | Park | G06F 21/31 |
| | | | 345/173 |
| 2015/0148005 A1* | 5/2015 | Chau | G06Q 30/00 |
| | | | 455/26.1 |
| 2015/0221287 A1 | 8/2015 | Badawiyeh | |
| 2016/0006678 A1 | 1/2016 | Jung et al. | |
| 2016/0063230 A1* | 3/2016 | Alten | G06F 21/32 |
| | | | 726/28 |
| 2016/0227010 A1 | 8/2016 | Jung et al. | |
| 2020/0249895 A1 | 8/2020 | Hyun et al. | |
| 2023/0230130 A1 | 7/2023 | Jung et al. | |

FOREIGN PATENT DOCUMENTS

| | | | |
|---|---|---|---|
| KR | 10-2012-0055107 A | 5/2012 | |
| KR | 10-1160681 B1 | 6/2012 | |
| KR | 10-2012-0081886 A | 7/2012 | |
| KR | 10-2013-0110451 A | 9/2013 | |
| KR | 10-2014-0000038 A | 1/2014 | |
| KR | 10-2014-0050177 A | 4/2014 | |
| KR | 10-2015-0034582 A | 4/2015 | |
| WO | 2014/065812 A1 | 5/2014 | |

* cited by examiner

METHOD AND APPARATUS FOR PROVIDING LOCK-SCREEN

CROSS-REFERENCE TO RELATED APPLICATION(S)

This application is a continuation application of prior application Ser. No. 17/987,315, filed on Nov. 15, 2022, which has issued as U.S. Pat. No. 11,797,249 on Oct. 24, 2023, which is a continuation application of prior application Ser. No. 16/855,481, filed on Apr. 22, 2020, which is a continuation application of prior application Ser. No. 14/844,446, filed on Sep. 3, 2015, which has issued as U.S. Pat. No. 10,635,371 on Apr. 28, 2020, which was based on and claimed priority under 35 U.S.C. § 119(a) of a Korean patent application number 10-2014-0120005, filed on Sep. 11, 2014, in the Korean Intellectual Property Office, the disclosure of which is incorporated by reference herein in its entirety.

TECHNICAL FIELD

The present disclosure relates to a method and an apparatus for providing a lock-screen by which the lock-screen may be dynamically changed in response to a user interaction in an electronic device.

BACKGROUND

Currently, with the popularization of electronic devices, electronic devices adopting a touch screen have become mainstream. A user may use the electronic device using a simplified input method through the operation of touching the touch screen. However, in the case of the electronic device adopting the touch screen, the user may make an undesired touch to cause the malfunction of the electronic device. For example, the "unintended function" may be executed, which may occur when the electronic device is in the pocket or the bag. Therefore, in order to prevent the same, the electronic device provides a lock-screen that maintains the touch screen as a screen-lock mode or a touch-lock mode when the user does not make a touch input. The lock-screen is a function that prevents the electronic device from recognizing the unintended touch input of the user.

The locked state of the touch screen is different from the deactivation state of the touch screen. For example, the deactivation state of the touch screen refers to a state in which a user's touch input is not received, whereas the locked state of the touch screen refers to a state in which a user input for releasing the lock-screen can be received while the touch screen is activated. In general, the user may release the lock-screen by inputting a pattern, a password, or a pin number, which are set for the release of the lock-screen, with reference to the guidance displayed on the touch screen. For example, the user may make a specific input, such as flicking the screen or pressing a release button, to release the lock-screen, and then, may use a desired function in the electronic device. More particularly, the lock-screen, which is released through the input of a password or a specific pattern, may be utilized as main means for protecting the personal privacy.

The lock-screen is useful to the prevention of execution of an unintended function or the protection of the personal privacy, while the release operation is to be conducted whenever the user wishes to view simple information, such as the weather, or a calendar, which is inconvenient to the user.

For example, it may be very tiresome to release the lock whenever the user determines notifications, such as an application update notification, or a notification of receiving messages in a mobile messenger, which are frequently and irregularly created. In addition, typical electronic devices provide a lock-screen comprised of a single display image, but this is not enough for the user to reflect his or her personality. Furthermore, the typical electronic device maintains a single image until the user directly changes the lock-screen.

Therefore, a need exists for a method and an apparatus for providing a lock-screen by which the lock-screen may be dynamically changed in response to a user interaction in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that can change the lock-screen of the electronic device dynamically according to a simple user interaction, and an operation method thereof.

Another aspect of the present disclosure is to provide an electronic device that can support the changing of the lock-screen through a new interaction using one of a power button, a volume button, and a home button, or a combination thereof, in an electronic device while a display unit is in the off-state, and an operation method thereof.

Another aspect of the present disclosure is to provide an electronic device in which a new user interaction may be defined using various buttons of the electronic device while the original functions of the buttons are maintained, and in which the lock-screen may be changed more easily based on the defined user interaction, and an operation method thereof.

Another aspect of the present disclosure is to provide an electronic device that, when a display unit of an electronic device is turned off, can automatically configure the lock-screen to be displayed when the display unit is turned on again, and an operation method thereof.

Another aspect of the present disclosure is to provide an electronic device that can reconfigure the lock-screen as a background when a display unit is turned off, and when the display unit is turned on, or when the user inputs an interaction using a combination of buttons in the off-state of the display unit, can provide a new lock-screen corresponding to the interaction to the user, and an operation method thereof is provided.

Another aspect of the present disclosure is to provide an electronic device that can configure the lock-screen based on information gathered according to the configuration of the electronic device, and can dynamically change the configured interaction according to the user interaction to thereby provide the same, and an operation method thereof.

Another aspect of the present disclosure is to provide an electronic device that can implement an optimal environment to support the lock-screen in an electronic device to thereby enhance the convenience of the user and the usability of the electronic device, and an operation method thereof.

Another aspect of the present disclosure is to provide a computer-readable recording medium that records a program to execute the method above in a processor.

The description above explains features and technical effects of the various embodiments of the present disclosure briefly and widely in order for those skilled in the art to understand the present disclosure from the detailed description, which is made below, according to the various embodiments of the present disclosure. In addition to the features and the effects, additional features and effects of the present disclosure, which constitute the subject matter defined by the claims of the present disclosure, will be clearly understood from the detailed description according to the various embodiments of the present disclosure as described below.

In accordance with an aspect of the present disclosure, a method for providing a lock-screen is provided. The method includes turning off a display unit, configuring content for the lock-screen in response to the turning off of the display unit, receiving a user interaction, based on at least one button, turning on the display unit in response to the user interaction, and displaying the lock-screen that is changed based on the content configured to correspond to the user interaction when the display unit is turned on.

In accordance with another aspect of the present disclosure, an electronic device is provided. The electronic device includes a display unit configured to display a lock-screen, buttons configured to receive a user interaction, a memory configured to store the content for the lock-screen, and a controller configured to configure the content for the lock-screen in response to the turning off or turning on of the display unit, and make a control, when the user interaction is received based on at least one of the buttons, to display the lock-screen that is changed based on the content configured to correspond to the user interaction.

In accordance with another aspect of the present disclosure, a computer-readable recording medium is provided. The computer-readable recording medium that records a program to execute the operations of selecting the content for a lock-screen in response to the turning off or turning on of the display unit, changing the lock-screen, based on the selected content, receiving a user interaction, based on at least one button, and displaying the changed lock-screen when the display unit is turned on.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

4

Figure 4:
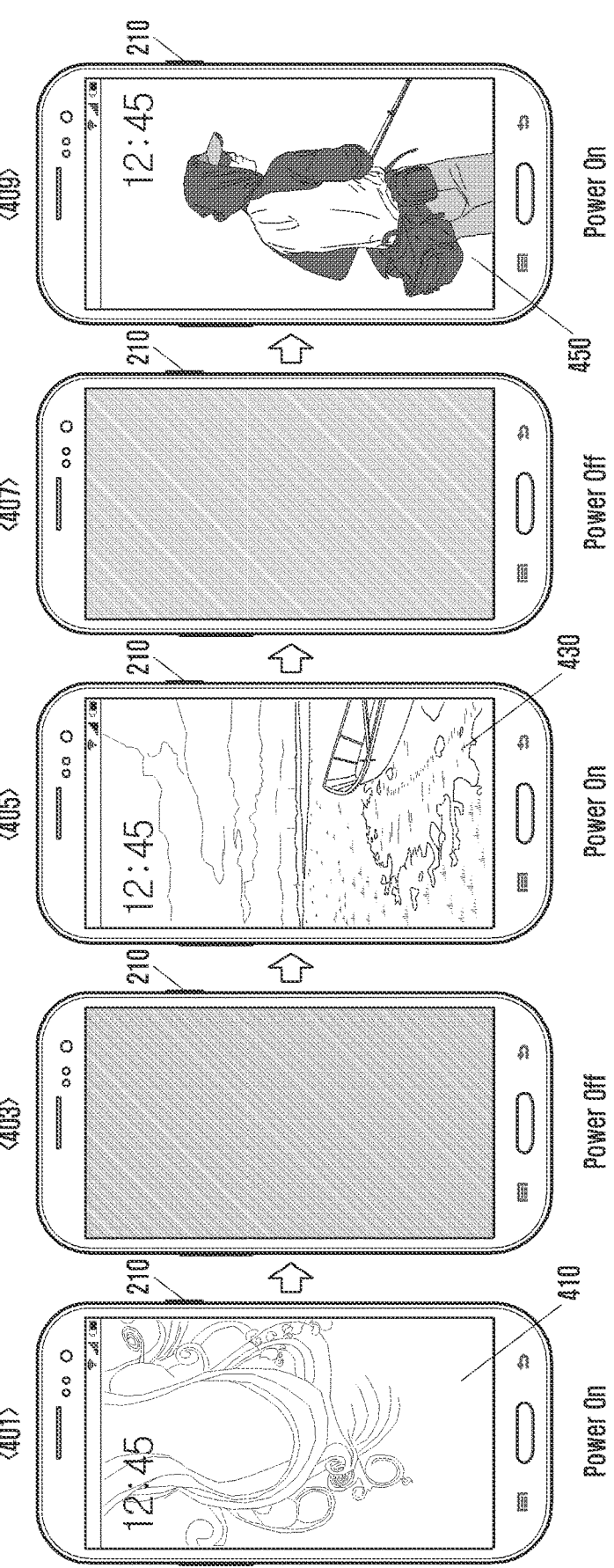
Figure 5:
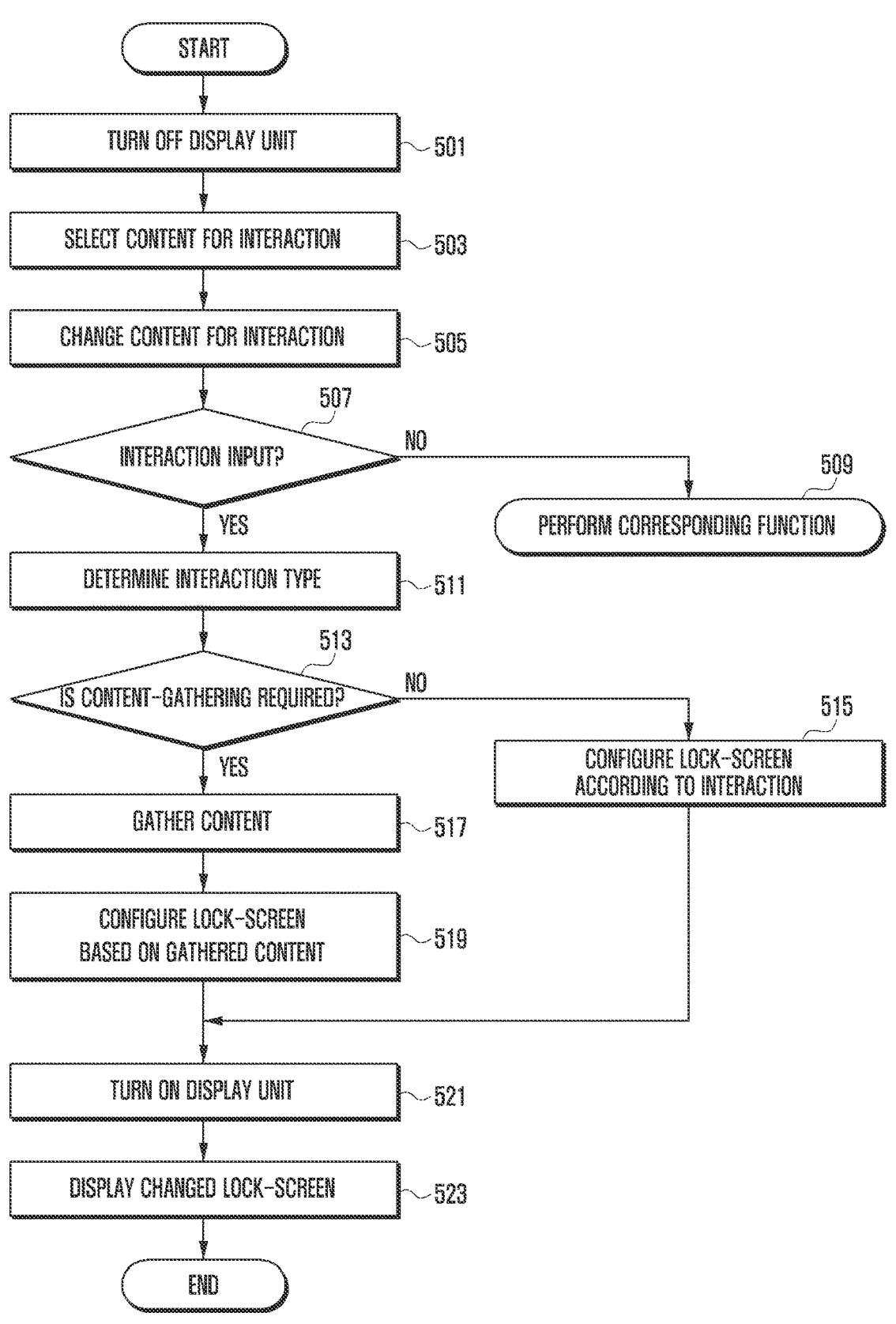
Figure 6:
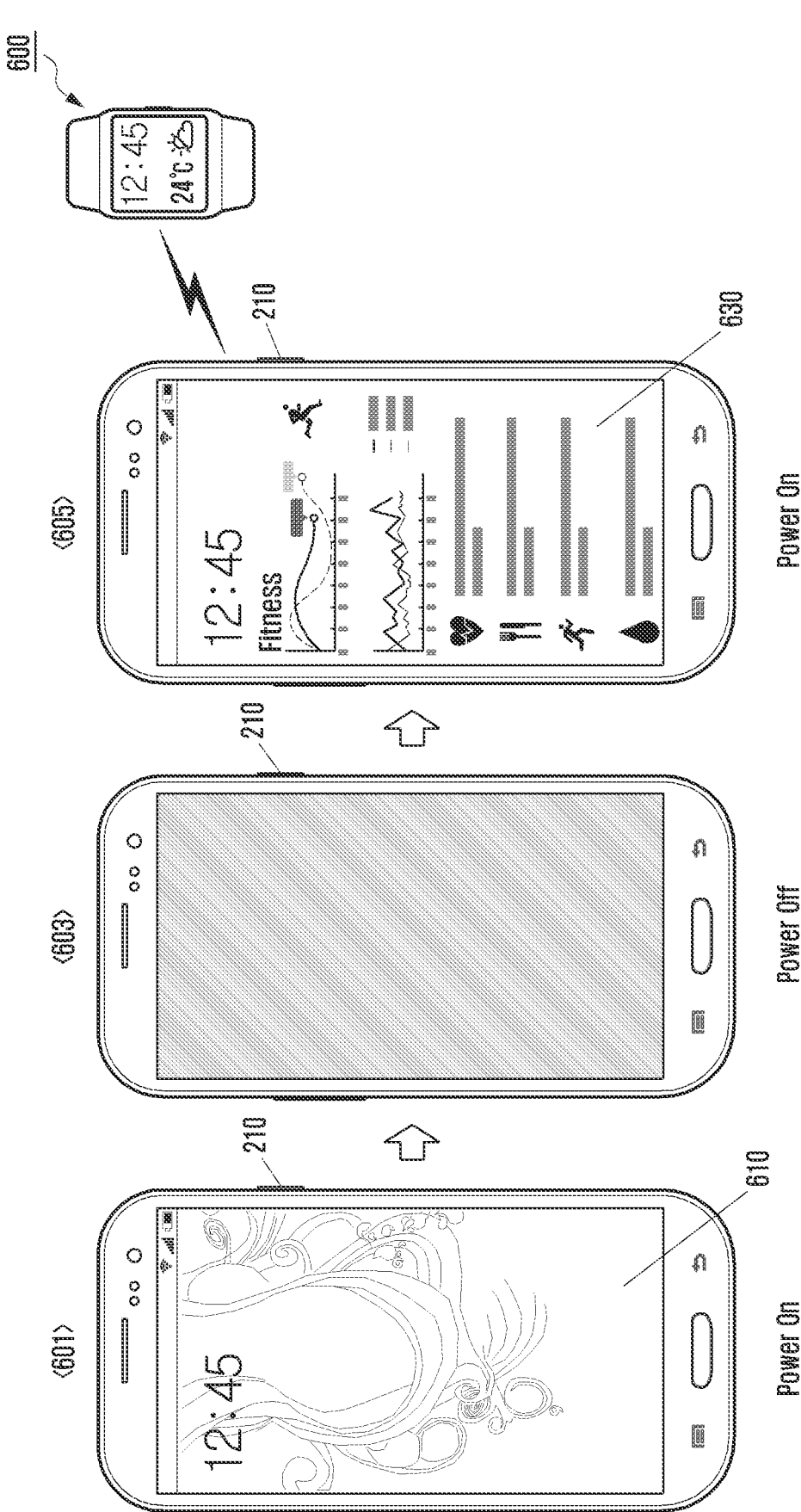
Figure 7A:
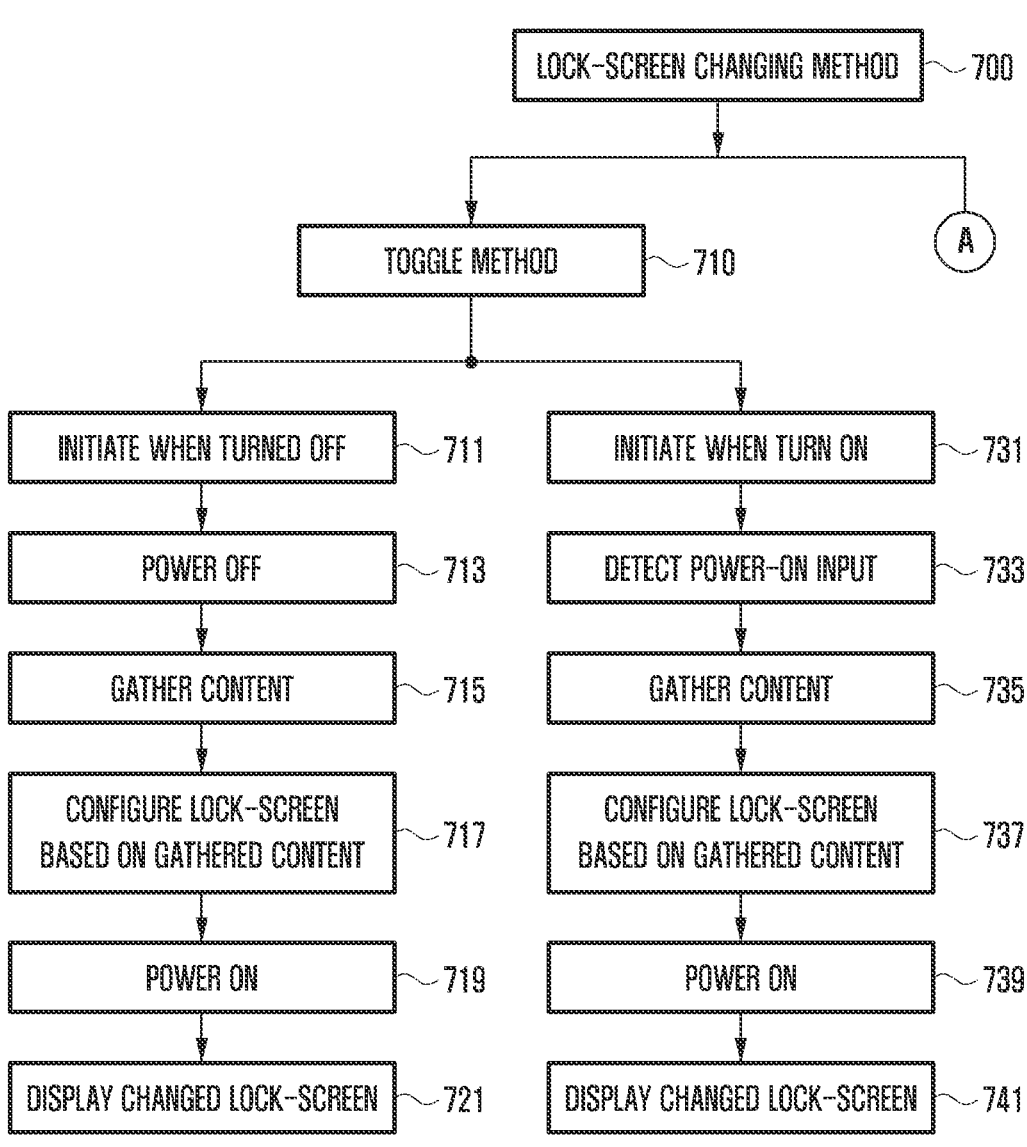
Figure 7B:
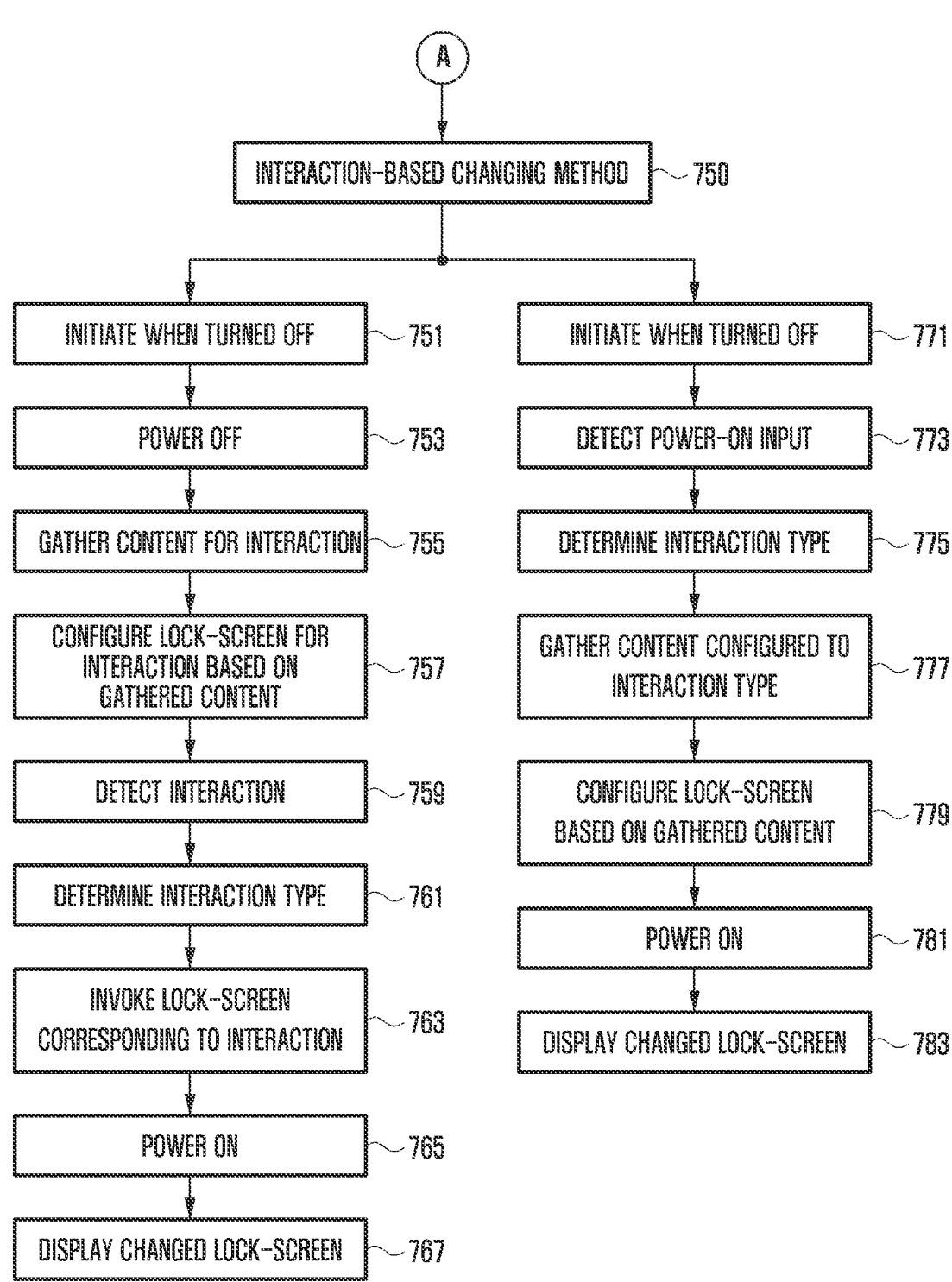
Figure 8:
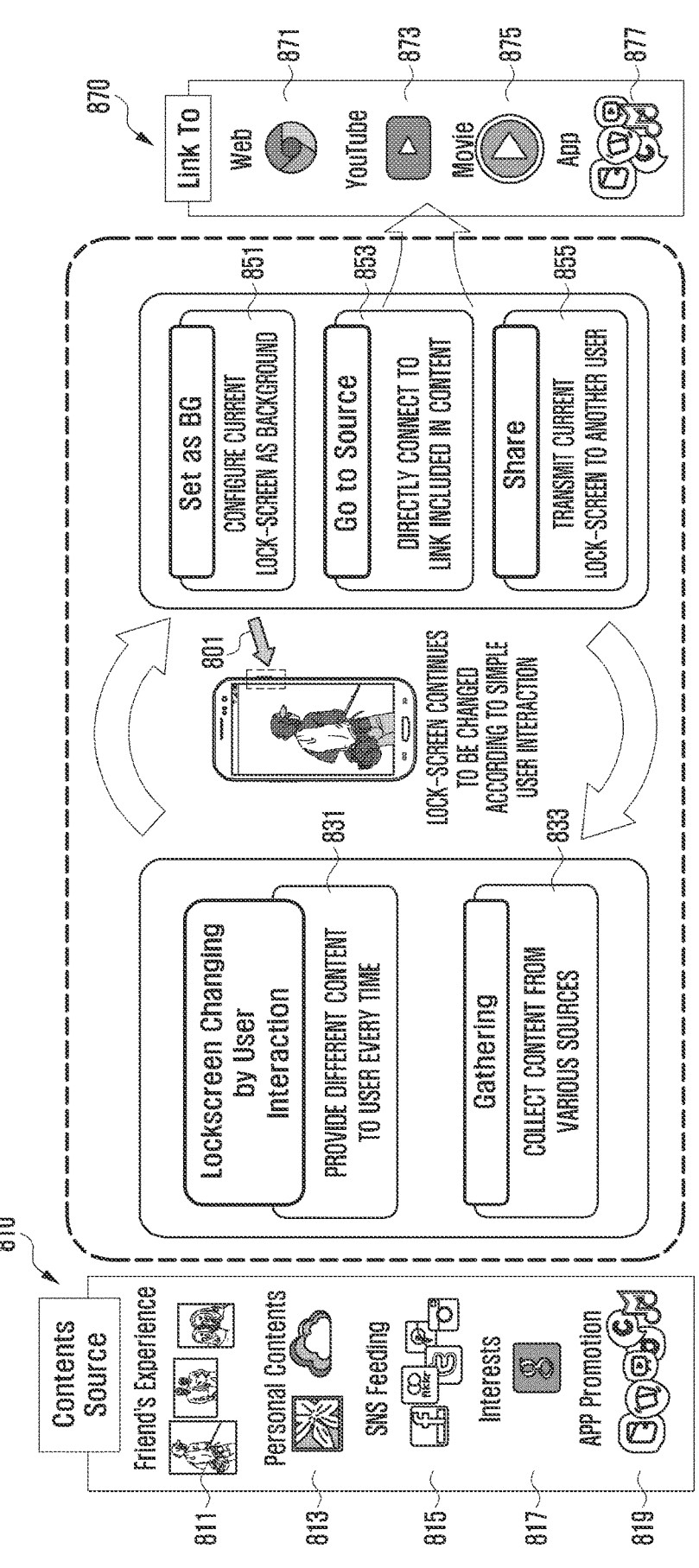
Figure 9:
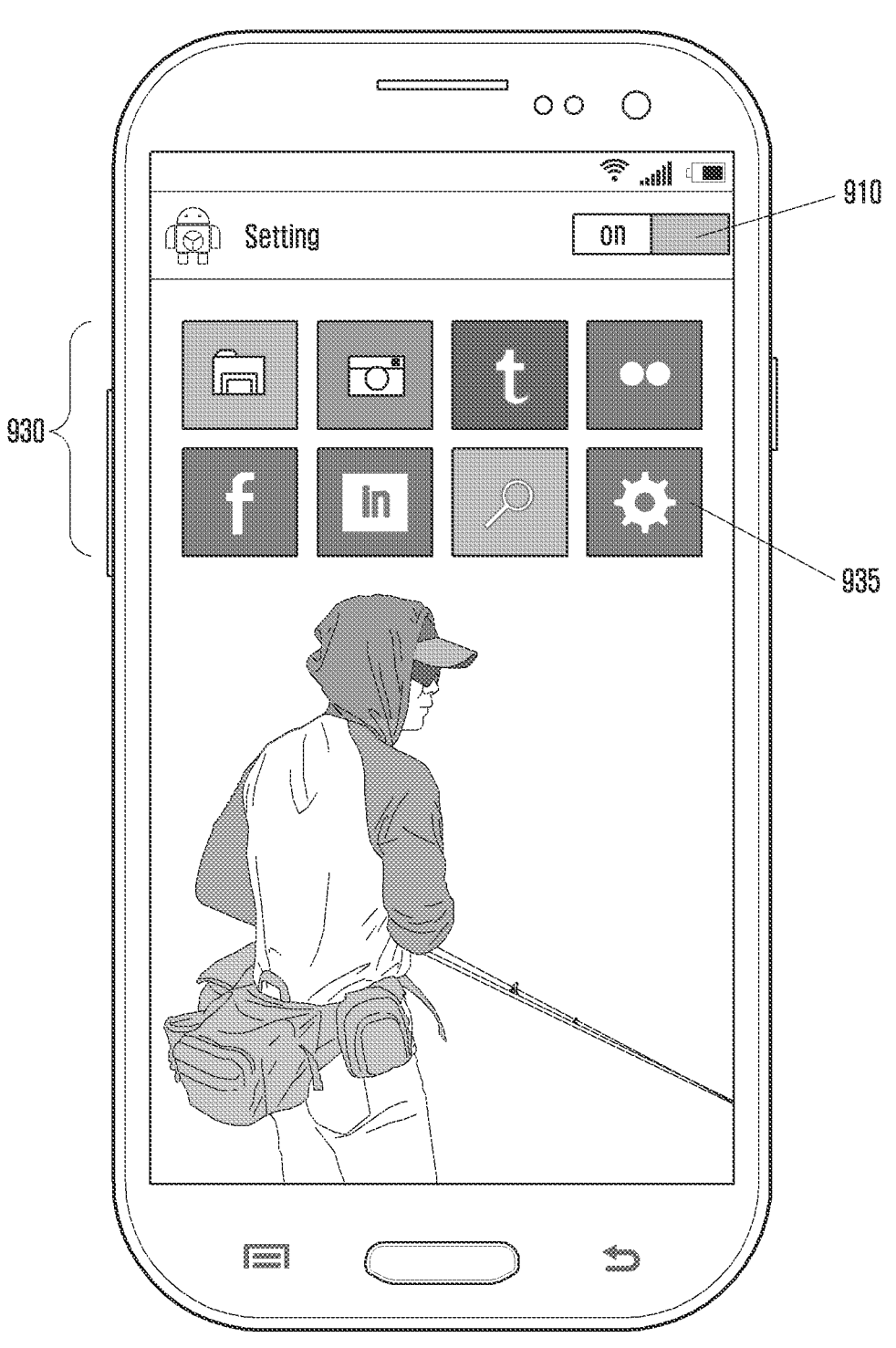
Figure 10:
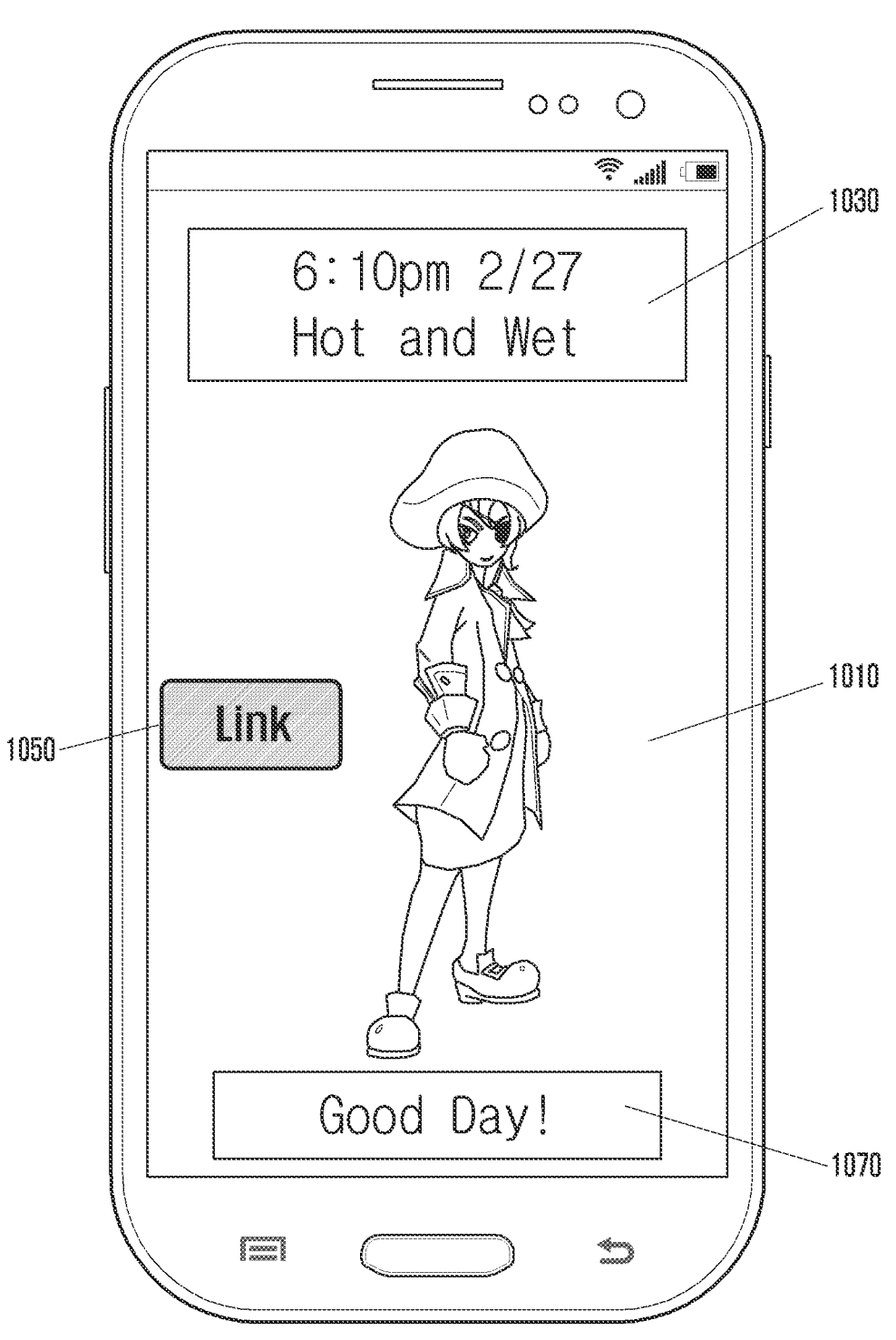
Figure 11:
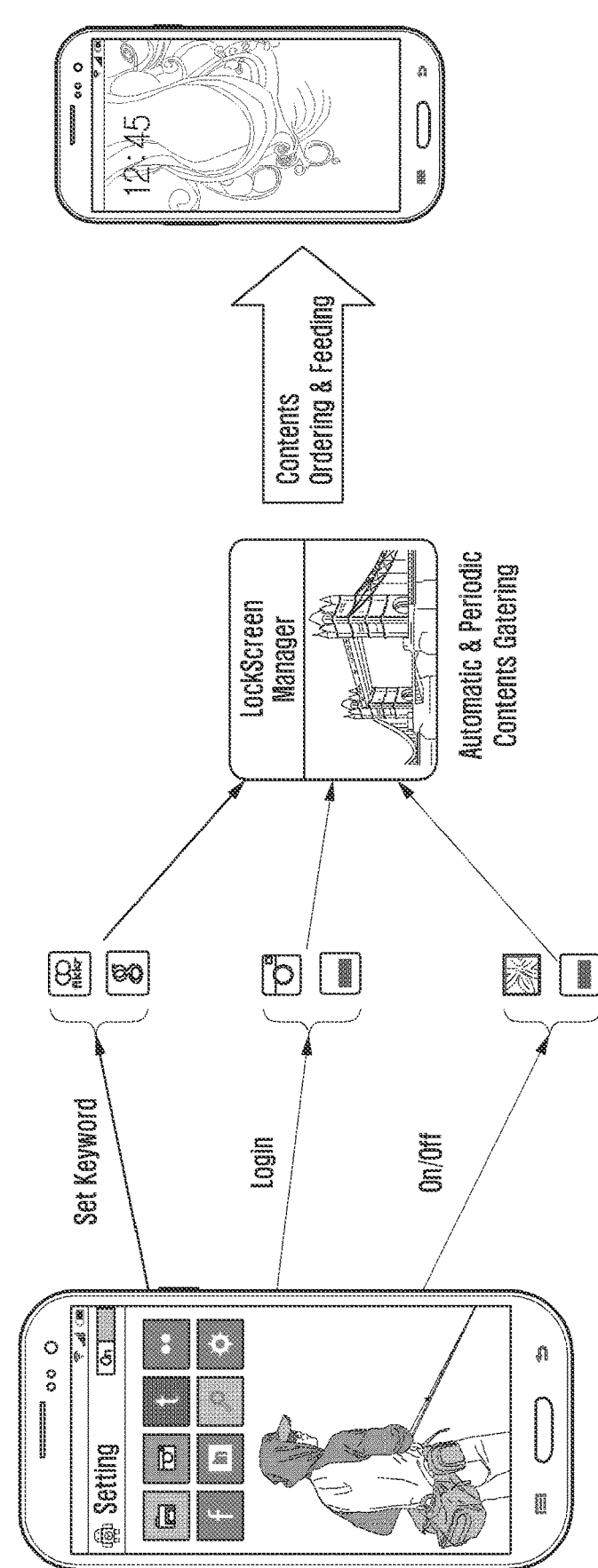
Figure 12:
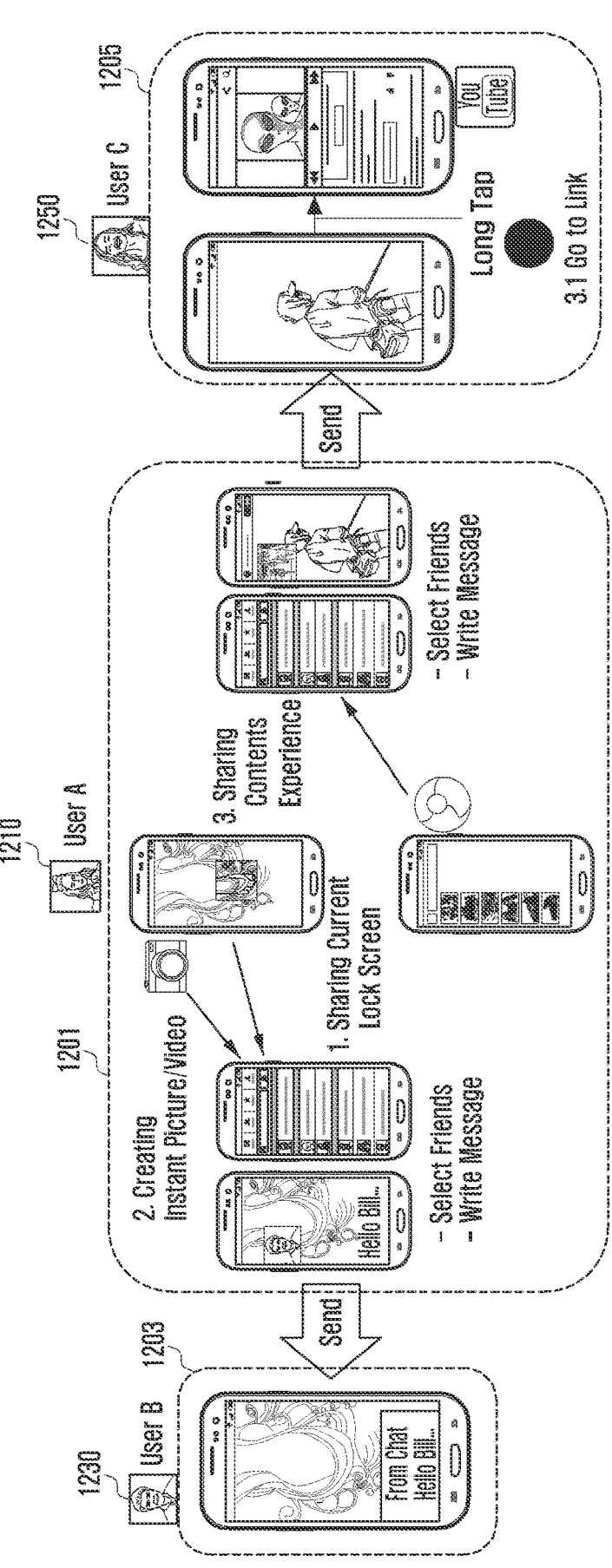

FIG. 4 is a diagram illustrating an operation of changing a lock-screen in an electronic device according to an embodiment of the present disclosure;

FIG. 5 is a flowchart of an operation of changing a lock-screen in an electronic device according to an embodiment of the present disclosure;

FIG. 6 is a diagram illustrating an operation of changing a lock-screen in an electronic device according to an embodiment of the present disclosure;

FIGS. 7A and 7B illustrate a lock-screen changing method and an operation of changing a lock-screen according thereto in an electronic device according to an embodiment of the present disclosure;

FIG. 8 is a diagram illustrating an operation of a lock-screen in an electronic device according to an embodiment of the present disclosure;

FIG. 9 is a diagram illustrating a configuration operation for gathering content in an electronic device according to an embodiment of the present disclosure;

FIG. 10 is a diagram illustrating a lock-screen implemented in an electronic device according to an embodiment of the present disclosure;

FIG. 11 is a diagram illustrating an operation for processing content-gathering in an electronic device according to an embodiment of the present disclosure; and FIG. 12 is a diagram illustrating an operation of changing a lock-screen based on the lock-screen sharing in an electronic device according to an embodiment of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The suggested disclosure relates to an electronic device that controls a configuration of the lock-screen and the display thereof, and an operation method of the same. According to an embodiment of the present disclosure, various lock-screens may be configured, and a user interaction for changing the lock-screen may be defined in the electronic device. In the embodiment of the present disclosure, the user interaction may be defined using at least one of various buttons adopted in the electronic device. Various buttons for defining the user interaction may include a power button, a volume button, or a home button, and one or more user interactions may be defined using a single button or a combination of two or more buttons.

In general, a single lock-screen, which has been configured by the user, is statically maintained in the electronic device. According to an embodiment of the present disclosure, the static lock-screen may be dynamically changed based on the user interaction using the buttons by the user.

For example, the inputting means that the user can easily and intuitively use while a display unit of the electronic device is turned off may be various buttons, such as a power button, a volume button, or a home button, which are mounted in one area of the electronic device. The embodiment of the present disclosure may define the user interaction related to the lock-screen display control, using the buttons or a combination thereof, which can be easily used by the user in the off-state of the display unit, and may support a new function in the lock-screen when the display unit is turned on using the same.

In various embodiments of the present disclosure, the electronic devices may include all of devices, such as information communication devices, multimedia devices, wearable devices, and application devices thereof, which use at least one of an application processor (AP), a graphical processing unit (GPU), and a central processing unit (CPU), and support functions according to various embodiments of the present disclosure.

For example, the electronic device, according to various embodiments of the present disclosure, may be the device that supports the lock-screen. Accordingly to some embodiments of the present disclosure, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a motion pictures expert group (MPEG-1 or MPEG-2) audio layer 3 (MP3) player, a portable medical device, a digital camera, or a wearable device (e.g., a head-mounted device (HMD), such as electronic glasses, electronic clothes, an electronic bracelet, an electronic necklace, electronic tattoos, an electronic accessory, a smart watch, and the like).

According to some embodiments of the present disclosure, an electronic device may be a smart home appliance that involves a lock-screen function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, and the like), a game console, an electronic dictionary, an electronic key, a camcorder, an electronic picture frame, and the like.

According to some embodiments of the present disclosure, an electronic device may be a medical device (e.g., magnetic resonance angiography (MRA), magnetic resonance imaging (MRI), computed tomography (CT), ultrasonography, and the like), a navigation device, a global positioning system (GPS) receiver, an event data recorder (EDR), a flight data recorder (FDR), a car infotainment device, electronic equipment for ship (e.g., a marine navigation system, a gyrocompass, and the like), avionics, security equipment, or an industrial or home robot, robot, an automatic teller machine of financial institutions, or point of sales of stores.

According to some embodiments of the present disclosure, an electronic device may be furniture or part of a building or construction having a lock-screen function, an electronic board, an electronic signature receiving device, a projector, or various measuring instruments (e.g., a water meter, an electric meter, a gas meter, a wave meter, and the like). An electronic device disclosed herein may be one of the above-mentioned devices or any combination thereof. Further, the electronic device according to the present disclosure may be a flexible device. It is noted that the above-mentioned electronic devices are not to be considered as a limitation of this disclosure.

The electronic device, according to the embodiment of the present disclosure, may be one of the various devices mentioned above, or a combination thereof, and it is obvious to those skilled in the art that the electronic device of the present disclosure is not limited thereto.

Figure 1:
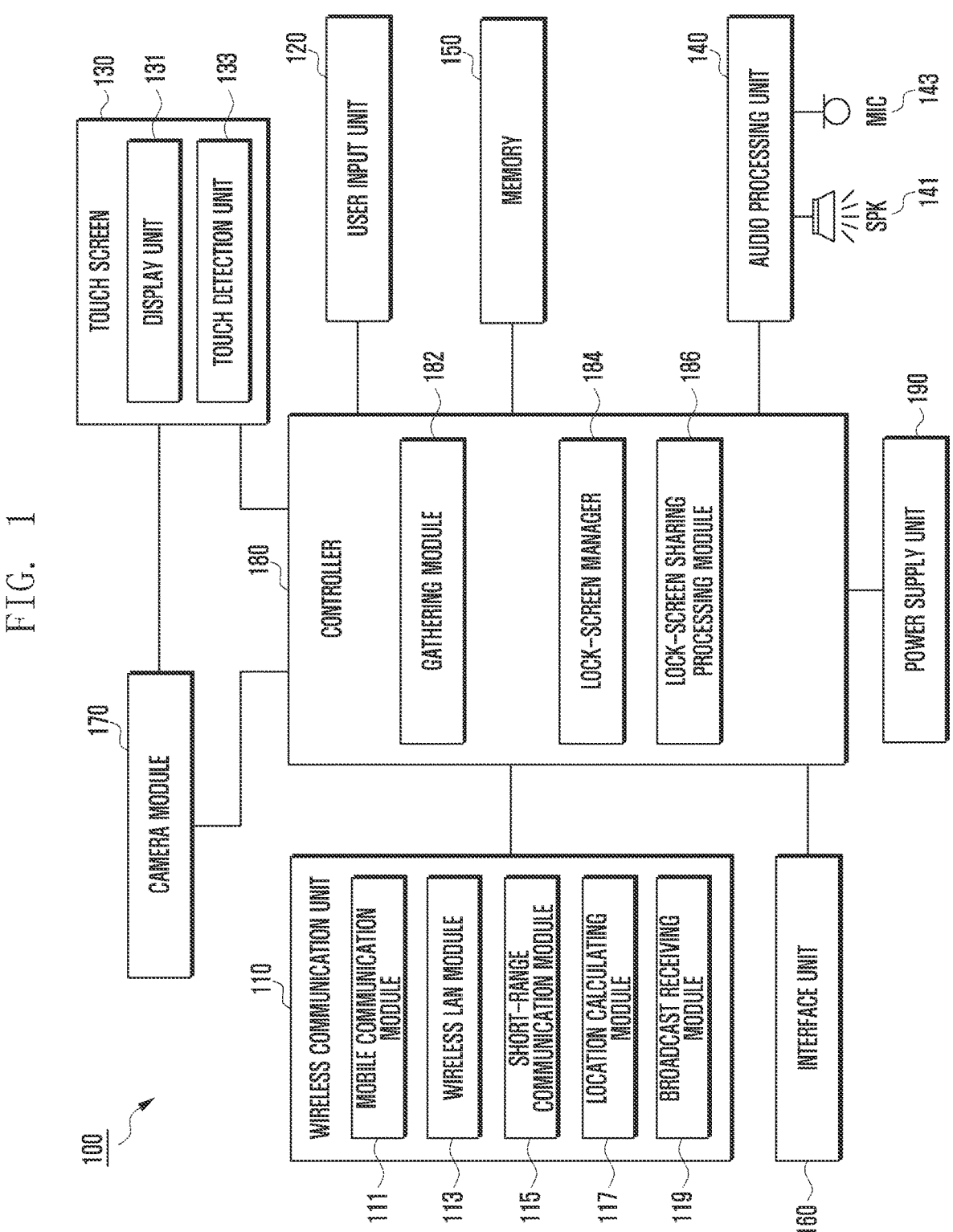
FIG. 1 schematically illustrates a configuration of an electronic device according to an embodiment of the present disclosure.

FIG. 1 schematically illustrates a configuration of an electronic device according to an embodiment of the present disclosure.

Referring to FIG. 1, an electronic device 100, according to various embodiments of the present disclosure, may include a wireless communication unit 110, a user input unit 120, a touch screen 130, an audio processing unit 140, a memory 150, an interface unit 160, a camera module 170, a controller 180, and a power supply unit 190. In various embodiments of the present disclosure, the elements illustrated in FIG. 1 are not indispensable for the electronic device 100, so the electronic device 100 may further include other elements in addition to the elements of FIG. 1, or may include a part thereof.

The wireless communication unit 110 may include one or more modules that enable the wireless communication between the electronic device 100 and a wireless communication system, or between the electronic device 100 and other electronic devices. For example, the wireless communication unit 110 may include a mobile communication module 111, a wireless local area network (WLAN) module 113, a short-range communication module 115, a location calculating module 117, and a broadcast receiving module 119.

The mobile communication module 111 may transmit/receive wireless signals to/from at least one of external electronic devices, and various servers (e.g., an integration server, a provider server, a content server, an internet server, a cloud server, and the like). The wireless signals may include a voice call signal, a video call signal, or data in various forms according to the transmission/reception of text/multimedia messages.

The mobile communication module 111 may receive one or more pieces of data (e.g., logs, content, messages, emails, images, videos, weather information, location information, time information, and the like). According to an embodiment of the present disclosure, the noble communication module 111 may be connected with at least one of other electronic devices or a server, which are connected with the electronic device 100 through a network (e.g., a mobile communication network), to obtain (receive) various pieces of data. The mobile communication module 111 may transmit various pieces of data necessary for the operation of the electronic device 100 to the outside (e.g., the server, or other electronic devices) in response to a user's request.

The wireless LAN module 113 may be a module that forms a wireless internet connection, or a wireless LAN link to another electronic device. The wireless LAN module 113 may be provided inside or outside the electronic device 100. As wireless internet technology, a wireless fidelity (Wi-Fi), wireless broadband (Wibro), world interoperability for microwave access (Wimax), high speed downlink packet access (HSDPA), or millimeter wave (mmWave) may be used.

The wireless LAN module 113 may transmit or receive one or more pieces of data selected by the user to or from the outside. According to an embodiment of the present disclosure, the wireless LAN module 113 may obtain data from at least one of other electronic devices or servers, which are connected with the electronic device 100 though the network (e.g., the wireless internet network). The wireless LAN module 113 may transmit or receive various pieces of data of the electronic device 100 to or from the outside (e.g., the server) in response to a user's request. The wireless LAN module 113 may transmit or receive various pieces of data corresponding to the user's selection to or from another electronic device when a wireless LAN link is formed between the same and another electronic device. The wireless LAN module 113 may always remain in the on-state, or may be turned on according to the configuration of the electronic device 100 or the user input.

The short-range communication module 115 may refer to a module that performs the short-range communication. The short-range communication technology may utilize bluetooth, bluetooth low energy (BLE), radio frequency identification (RFID), infrared data association (IrDA), ultra wideband (UWB), ZigBee, or near field communication (NFC).

The short-range communication module 115 may receive one or more pieces of data. According to an embodiment of the present disclosure, the short-range communication module 115 may obtain data from other electronic devices that are connected with the electronic device 100 though the network (e.g., the short-range communication network). The short-range communication module 115 may transmit or receive the data corresponding to the user's selection to or from another electronic device when the short-range communication is established between the same and another electronic device. The short-range communication module 115 may always remain in the on-state, or may be turned on according to the configuration of the electronic device 100 or the user input.

The location calculating module 117, which obtains the location of the electronic device 100, typically, may include a GPS. For example, the location calculating module 117 may calculate distance information and time information on the location distant from three or more base stations, and may calculate three-dimensional current location information according to the latitude, the longitude, and the altitude by applying the trigonometry to the calculated information. Alternatively, the location calculating module 117 may continue to receive the location information of the electronic device 100 from three or more satellites in real time to thereby calculate the location information. The location information of the electronic device 100 may be obtained in various ways.

The broadcast receiving module 119 may receive broadcasting signals (e.g., TV broadcasting signals, radio broadcasting signals, data broadcasting signals, and the like) and/or broadcast-related information (e.g., broadcasting channels, broadcasting programs, or information related to a broadcasting service provider) from an external broadcasting management server through broadcasting channels (e.g., satellite broadcasting channels, terrestrial broadcasting channels, and the like).

The user input unit 120 may create input data for controlling the operation of the electronic device 100 in response to the user input. The user input unit 120 may include at least one input means for detecting various user inputs. For example, the user input unit 120 may include a key pad, a dome switch, buttons, a touch pad (pressure type/capacitive type), a Jog & Shuttle, or sensors. In various embodiments of the present disclosure, the buttons may receive the user input for executing a certain function, and may be implemented in at least one of a button type or a touch pad type. In addition, the buttons may include at least one of a soft type that is provided in at least a partial area of the touch screen 130, or a hard type that is provided in the area rather than the touch screen 130.

According to some embodiments of the present disclosure, the sensor may include, for example, a voice recognition sensor, a finger scan sensor, an infrared (IR) sensor, an acceleration sensor, a gyro sensor, a terrestrial sensor, an illumination sensor, a color sensor, an image sensor, a temperature sensor, a proximity sensor, a motion recognition sensor, a heart rate monitor (HRM) sensor, an iris scan sensor, an electroencephalogram (EEG) sensor, an electrocardiogram (ECG) sensor, or a pressure sensor.

Some of the user input unit 120 may be implemented as buttons provided outside the electronic device 100, or some of or all of the user input unit 120 may be implemented as a touch panel. The user input unit 120 may receive a user input for initiating the operation of the electronic device 100, according to various embodiments of the present disclosure, and may create an input signal due to the user input. For example, the user input unit 120 may receive various user inputs for performing the operations of displaying or changing the lock-screen, executing a specific application, inputting (writing, or inserting) data, changing the posture of the electronic device 100, displaying the content, connecting to the network, or transmitting or receiving data, and may create input signals in response to the user inputs.

The touch screen 130 refers to an input/output means that can perform both an inputting function and a displaying function, and may include a display unit 131 and a touch detection unit 133. In the embodiment of the present disclosure, the touch screen 130 may display various display images resulting from the operation of the electronic device 100 through the display unit 131. The various display images, for example, may include the lock-screen, a fingerprint recognition image, a messenger image, a phone call image, game images, movie playing images, gallery images, web page images, a home image, or network connection images. The touch screen 130 may detect an event (e.g., a touch event, a hovering event, an air gesture event, and the like) based on at least one of a touch, a hovering, or an air gesture from the user through the touch detection unit 133 while a specific image is displayed through the display unit 131, to thereby transfer the input signal according to the event to the controller 180. The controller 180 may identify the transferred event, and may perform the operation corresponding to the event.

The display unit 131 may display various pieces of information processed in the electronic device 100. For example, when the electronic device 100 operates in a lock-screen mode, the display unit 131 may display a related user interface (UI) or graphical UI (GUI). In addition, when the electronic device 100 is in a phone call mode, the display unit 131 may display a UI or a GUI, which is related to the phone call. When the electronic device 100 is in a video call mode or in a photographing mode, the display unit 131 may display a UI or a GUI, which is related to photographed and/or received images, and the operation of the corresponding mode. The display unit 131 may display information on the data related to the use of the electronic device 100, the content, or other electronic devices connected to the network. The display unit 131 may display various application execution images corresponding to the executed applications.

The display unit 131 may support the display in a horizontal mode or in a vertical mode, or the display due to the change between the horizontal mode and the vertical mode, according to the rotating direction (or lying direction) of the electronic device 100.

The display unit 131 may include at least one of a liquid crystal display (LCD), a thin film transistor-LCD (TFT LCD), a light emitting diode (LED), an organic LED (OLED), an active matrix OLED (AMOLED), a flexible display, a bended display, or a 3D display. Some of the displays may be implemented by a transparent display that is transparent or light-transparent.

The touch detection unit 133 may be placed in the display unit 131, and may detect the user input, such as a touch or proximity with respect to the surface of the touch screen 130. The user input may include a touch event or a proximity event, which is input based on at least one of a single touch, a multi-touch, a hovering, or an air gesture. For example, the user input may be performed in the form of a tap, a drag, a sweep, a flick, a swipe, a drag & drop, a drawing gesture (e.g., writing), and the like. The touch detection unit 133 may detect the user input (e.g., the touch event, or the proximity event) on the surface of the touch screen 130, and may create a signal corresponding to the detected user input to thereby transfer the same to the controller 180. The controller 180 may control the execution of a function corresponding to the area where the user input (e.g., the touch event, or the proximity event) has occurred, using the signal transferred from the touch detection unit 133.

In the various embodiments of the present disclosure, the touch detection unit 133 may receive the user input for initiating the operation related to the use of the electronic device 100, and may create an input signal corresponding to the user input.

The touch detection unit 133 may be configured to transform a change in the pressure on a specific area of the display unit 131 or a change in the capacitance generated in a specific area of the display unit 131 into an electrical input signal. The touch detection unit 133 may detect the position or the area on the surface of the display unit 131, which the input means (e.g., user's fingers, electronic pens, and the like) touch or approach. In addition, the touch detection unit 133 may be implemented to detect the pressure of the touch according to an applied touching type. When a touch or a proximity input with respect to the touch detection unit 133 is received, the signal(s) corresponding thereto may be transferred to a touch controller (not shown). The touch controller (not shown) may process the signal(s) to then transfer the corresponding data to the controller 180. Accordingly, the controller 180 may identify which area has been touched or has received the proximity input, and may process the execution of the function corresponding thereto.

The audio processing unit 140 may transmit an audio signal received from the controller 180 to a speaker (SPK) 141, and may forward an audio signal, such as a voice, received from a microphone (MIC) 143 to the controller 180. The audio processing unit 140 may transform voice/sound data into audible sounds to be output through the speaker 141, under the control of the controller 180, and may transform an audio signal, such as a voice, received from the microphone 143 into a digital signal to be transmitted to the controller 180. The audio processing unit 140 may output an audio signal in response to the user input, according to audio processing information (e.g., effect sounds, music files, and the like) inserted into the data.

The speaker 141 may output audio data, which is received from the wireless communication unit 110, or is stored in the memory 150. The speaker 141 may output sound signals related to various operations (functions) executed in the electronic device 100.

The microphone 143 may receive external sound signals, and may process the same into electrical sound data. The voice data processed by the microphone 143 may be transformed into a transmittable form to be then output, through the mobile communication module 111 in the phone call mode. Various noise reduction algorithms may be applied to the microphone 143 in order to eliminate noises generated in the course of receiving the external sound signals.

The memory 150 may store one or more programs to be executed by the controller 180, and may have a function of temporarily storing input/output data. The input/output data, for example, may include logs, content, messenger data (e.g., chatting data), contact information (e.g., wired or wireless telephone numbers), messages, media files (e.g., audio files, movie files, or image files), and the like.

The memory 150 may store various programs and data, which are related to the lock-screen control of the electronic device 100. For example, in the embodiment of the present disclosure, the memory 150 may store one or more lock-screen images, which are comprised of the information obtained from the inside or the outside, one or more programs for gathering information for configuring the lock-screen from the outside and for processing the change of the lock-screen in response to the user interaction, and the data processed according thereto.

In various embodiments of the present disclosure, the one or more programs may include a program to execute the operations of: turning off a display unit 131, configuring content for the lock-screen in response to the turning off of the display unit 131, receiving a user interaction, based on at least one button, turning on the display unit 131 in response to the user interaction, and displaying the lock-screen that is change based on the content configured to correspond to the user interaction when the display unit 131 is turned on.

The memory 150 may store the frequency of the use (e.g., the frequency of using an application, or the frequency of using content), the importance, and the priority according to the operation of the electronic device 100 as well. The memory 150 may store the data on various patterns of vibrations and sounds output in response to the touch input or the proximity input on the touch screen 130. The memory 150 may permanently or temporarily store an operating system (OS) of the electronic device 100, programs related to the input and the display control using the touch screen 130, programs related to the control of various operations (functions) of the electronic device 100, and various pieces of data created according to the operation of the programs.

The memory 150 may include at least one storage medium of a memory in a flash memory type, a hard disk type, a micro type, or a card type (e.g., a secure digital (SD) card or an eXtreme digital (XD) card), a dynamic random access memory (DRAM), a static RAM (SRAM), a read-only memory (ROM), a programmable ROM (PROM), an electrically erasable PROM (EEPROM), a magnetic RAM (MRAM), a magnetic disk), or an optical disk. The electronic device 100 may operate in interwork with a web storage that replaces the storage function of the memory 150 through the Internet.

The interface unit 160 may play the role of an interface between the electronic device 100 and external devices connected with the electronic device 100. The interface unit 160 may enable the operation of receiving data from the external devices, applying the supplied power to elements in the electronic device 100, or transmitting the data in the electronic device 100 to the external devices. For example, the interface unit 160 may include a wired/wireless headset port, an external charging port, a wired/wireless data port, a memory card port, a port connected with a device adopting an identification module, an audio input/output port, a video input/output port, an earphone port, and the like.

The camera module 170 supports a photographing function of the electronic device 100. The camera module 170 may support the photographing of object images (still images, or moving images). The camera module 170 may photograph a certain object, and may transfer the photographed data to the display unit 131 and the controller 180, according to the control of the controller 180. The camera module 170 may include an image sensor (or camera sensor) (not shown), which transforms an input optical signal into an electrical signal, and an image signal processing unit (not shown) that transforms the electrical signal received from the image sensor into a digital image data. The image sensor may include sensors in a charge-coupled device (CCD) type, or complementary metal-oxide-semiconductor (CMOS) type. The camera module 170 may provide an image processing function to support various photographing options (e.g., zooming) according to a user setup, a screen ratio, or effect photographing (e.g., sketch, mono, sepia, vintage, mosaic, frame, and the like).

The controller 180 may control overall operations of the electronic device 100. For example, the controller 180 may perform the control related to voice communication, data communication, or video communication. In the embodiment of the present disclosure, the controller 180 may control the operation of configuring and changing the lock-screen.

For example, the controller 180 may configure the content for the lock-screen in response to the turning off or turning on of the display unit 131. When the user interaction based on at least one button (e.g., the power button, the volume button, or the home button) is received, the controller 180 may change the lock-screen, based on the content configured to correspond to the user interaction. The controller 180 may make a control to display the changed lock-screen when the display unit 131 is turned on. In addition, the controller 180 may process a series of operations for gathering the content for the lock-screen in response to a certain condition through the inside (e.g., the memory 150) or the outside (e.g., the external server or other electronic devices), and storing the content in the memory 150.

In the embodiment of the present disclosure, the controller 180 may be implemented by one or more processors that control the operation of the electronic device 100 of the present disclosure by executing one or more programs stored in the memory 150. For example, the controller 180 may include a gathering module 182, a lock-screen manager 184, and a lock-screen sharing module 186.

The gathering module 182 may gather one or more pieces of content for the lock-screen according to a certain condition. The gathering module 182 may perform the content-gathering dynamically, according to a certain period, or in response to a specific event (e.g., the user interaction according to a combination of buttons) for gathering. In addition, the gathering module 182 may gather different pieces of content for each of various certain interactions in gathering the content. For example, the gathering module 182 may gather the content corresponding to the user interaction according to the type of content configured for each user interaction.

The lock-screen manager 184 may process the dynamic change of the lock-screen, based on the user interaction. The lock-screen manager 184 may perform a series of operations related to configuring the lock-screen based on the gathered content when the display unit 131 is turned off or turned on. The lock-screen manager 184 may stop the content-gathering of the gathering module 182 temporarily according to a certain condition, and may resume the content-gathering when a certain condition is satisfied. For example, the lock-screen manager 184 may perform the content-gathering when the pool size of the gathered content is less than a reference value (e.g., 30) of the lock-screen pool size, which is set for the lock-screen, according to the turn-on/turn-off of the display unit 131. In the embodiment of the present disclosure, the pool, for example, may refer to a temporary space of a fixed size, which is allocated to store the gathered content in the memory 150 of the electronic device 100. In addition, the lock-screen manager 184 may determine the period of gathering the content, and may manage the gathering module 182 to gather the content in a corresponding period in various methods. In addition, the lock-screen manager 184 may periodically change the content of the lock-screen as a background, based on the gathered content.

The lock-screen sharing module 186 may perform a series of operations related to changing the lock-screens of other electronic devices, based on the content of the electronic device 100. For example, the lock-screen sharing module 186 may perform the operation of sharing the lock-screen or the content for the lock-screen of the electronic device 100 with other electronic devices.

The controller 180, according to various embodiments of the present disclosure, may control various operations related to normal functions of the electronic device 100 as well as the functions mentioned above. For example, when a specific application is executed, the controller 180 may control the operation and the display thereof. In addition, the controller 180 may receive input signals corresponding to various touch events or proximity event inputs supported by the touch-based or proximity-based input interface (e.g., the touch screen 130), and may control the function operation according thereto. In addition, the controller 180 may control the transmission/reception of various pieces of data based on the wired communication or wireless communication.

The power supply unit 190 may supply the power from an external power source or an internal power source to the elements for their operation, under the control of the controller 180. In the embodiment of the present disclosure, the power supply unit 190 may supply or block the power to the display unit 131 according to the control of the controller 180.

Various embodiments described in the present disclosure may be implemented in a computer or its equivalent-readable recording medium, using software, hardware, or a combination thereof. In the implementation of hardware, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, an electric unit for executing other functions, and the like.

In the embodiment of the present disclosure, the recording medium may include a computer-readable recording medium that records a program to execute the operations of selecting the content for a lock-screen in response to the turning off or turning on of the display unit 131, changing the lock-screen, based on the selected content, receiving a user interaction, based on at least one button (e.g., at least one of the power button, the volume button, or the home button), and displaying the changed lock-screen when the display unit 131 is turned on.

In addition, in some cases, the various embodiments described in the present specification may be implemented as the controller 180. In addition, in the implementation of software, the embodiments of the present disclosure, such as the operations and functions, described in the present specification may be implemented as separate software modules. The software modules may perform one or more functions and operations described in the present specification.

Hereinafter, the term 'lock-screen' may be used as a meaning to include at least one piece of content that can be displayed in the lock-screen. In the following description, the content may be used as a broad meaning including text, images, music, movies, icons, links, apps, or web pages, and the content may be comprised of information, such as messages, feed, news, photos, stock information, and the like, which is gathered or received from the inside (e.g., the memory 150) or the outside (e.g., the external server or other electronic devices). In addition, the user interaction, in the embodiment of the present disclosure, may be used as a meaning including the user inputs based on one or more buttons set for the lock-screen when the display unit 131 of the electronic device 100 is in the off-state.

Figure 2:
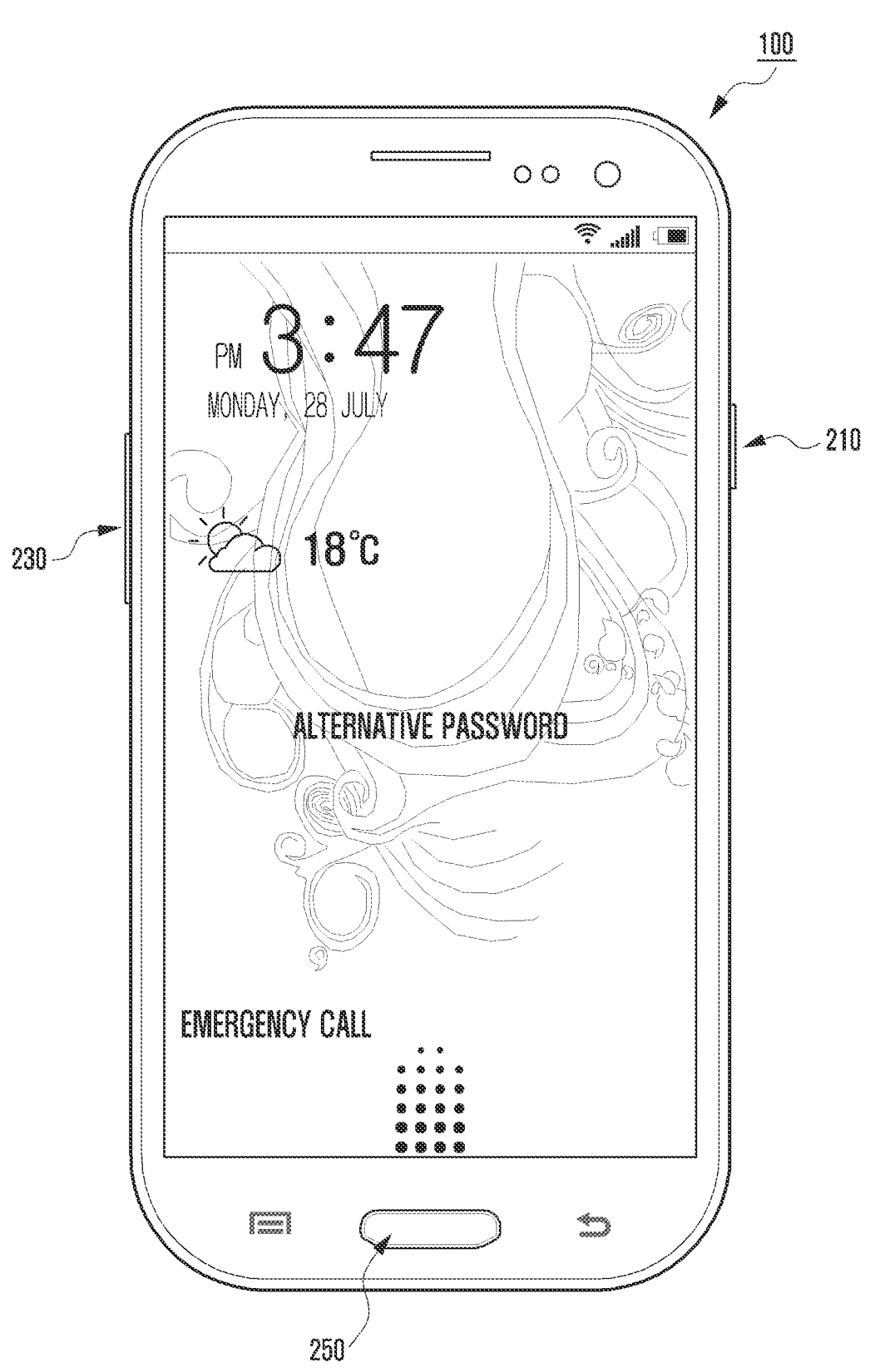
FIG. 2 is a diagram illustrating a combination of buttons for changing a lock-screen in an electronic device according to an embodiment of the present disclosure.

FIG. 2 is a diagram illustrating a combination of buttons for changing a lock-screen in an electronic device according to an embodiment of the present disclosure.

Referring to FIG. 2, in the embodiment of the present disclosure, the user interaction for changing the lock-screen may be defined with respect to at least one of various buttons of the electronic device 100. In the embodiment of the present disclosure, the buttons may include a power button 210, a volume button 230, and a home button 250. In the embodiment of the present disclosure, the buttons (e.g., the power button 210, the volume button 230, and the home button 250), in which the user interaction is defined, may be mounted in the main body of the electronic device 100 to receive a press input from the user, and may transfer related information to the controller 180 in order to perform the original function (the first function) thereof and a function (the second function) for controlling the lock-screen.

According to an embodiment of the present disclosure, one or more user interactions may be defined by a single button or a combination thereof from among the power button 210, the volume button 230, or the home button 250.

According to an embodiment of the present disclosure, the first interaction may be configured with respect to the power button 210, and the second interaction and the third interaction may be configured with respect to the volume button 230 and the home button 250, respectively. Alternatively or additionally, the first interaction, the second interaction, and the third interaction may be configured in various ways according to the input method (e.g., the number of presses, or pressing time) of the corresponding button. For example, the first interaction may be configured in various input methods, such as a press/short press, a long press, or a double press with respect to the power button 210. The second interaction may be configured in various input methods, such as a volume-up button press, a volume-down button press, a long press, a volume-up/down press, or a volume-down/up press with respect to the volume button 230. The third interaction may be configured in various input methods, such as a press/short press, a long press, or a double press with respect to the home button 250. In the embodiment of the present disclosure, the user interaction may be additionally defined for changing the lock-screen while the first function certain with respect to the corresponding button is maintained. For example, the interaction corresponding to each button may be configured in various ways unless it conflicts with the first function of the corresponding button. Accordingly, the user may execute the first function (e.g., the control of turning on/off the display unit using the power button 210, the control of turning up/down the volume using the volume button 230, or the control of moving on to the home image using the home button 250), or may change the lock-screen by altering the input method, based on the corresponding button.

According to an embodiment of the present disclosure, the user interaction may be configured by a combination of two or more of the power button 210, the volume button 230, or the home button 250. For example, the fourth interaction may be defined as pressing (pressing at the same time or in sequence within a time difference range) both the power button 210 and the volume button 230. In addition, the fifth interaction may be defined as pressing both the power button 210 and the home button 250, and the sixth interaction may be defined as pressing both the volume button 230 and the home button 250. The seventh interaction may be defined as simultaneously pressing the power button 210, the volume button 230, and the home button 250. In the embodiment of the present disclosure, the first interaction to the seventh interaction are defined for convenience of explanation, and one or more interactions may be implemented according to various combinations of the buttons depending on various configurations by the user.

The scenario to change the lock-screen based on the user interaction, according to an embodiment of the present disclosure, will be described.

First, in the embodiment of the present disclosure, the method for changing the lock-screen through the user interaction may be conducted while the display unit 131 is in the off-state. However, in various embodiments of the present disclosure, the lock-screen changing method may be conducted while the display unit 131 is in the on-state and the lock-screen is displayed, according to the user interaction.

According to an embodiment of the present disclosure, the display unit 131 is turned on according to the user interaction of a press/short press on the power button 210, and at the same time, a new lock-screen content different from the previous lock-screen content may be displayed.

According to an embodiment of the present disclosure, the display unit 131 is turned on according to the user interaction of a long press on the power button 210, so that the previous lock-screen content may be changed into/may include health information gathered from a wearable device to be thereby displayed.

According to an embodiment of the present disclosure, the display unit 131 is turned on according to the user interaction of a double press on the power button 210, so that the previous lock-screen content may be changed into/may include information, such as news or stock information, to be thereby displayed.

According to an embodiment of the present disclosure, the display unit 131 is turned on according to the user interaction of pressing both the power button 210 and the volume button 230 (e.g., the volume-up button), so that the previous lock-screen content may be changed into/may include shortcut information and/or link information to the music or video content, which recently has been frequently reproduced by the user, to be thereby displayed.

According to an embodiment of the present disclosure, the display unit 131 is turned on according to the user interaction of pressing both the power button 210 and the volume button 230 (e.g., the volume-down button), so that the previous lock-screen content may be changed into/may include shortcut information and/or link information to the music or video content, which is most popular (e.g., the weekly best) for a certain period of time (e.g., a week), to be thereby displayed.

According to an embodiment of the present disclosure, the display unit 131 is turned on according to the user interaction of pressing both the power button 210 and the home button 250, so that the previous lock-screen content may be changed into/may include social networking service (SNS) feed information (e.g., sports-related information) to be thereby displayed. For example, sports-related information may be provided among the SNS feed content through the lock-screen.

According to an embodiment of the present disclosure, in addition to the methods above, the user may configure the interactions and the lock-screen content through various combinations of the buttons according to the user's configuration, and the dynamic change of the lock-screen may be supported according to the configured user interaction.

Figure 3:
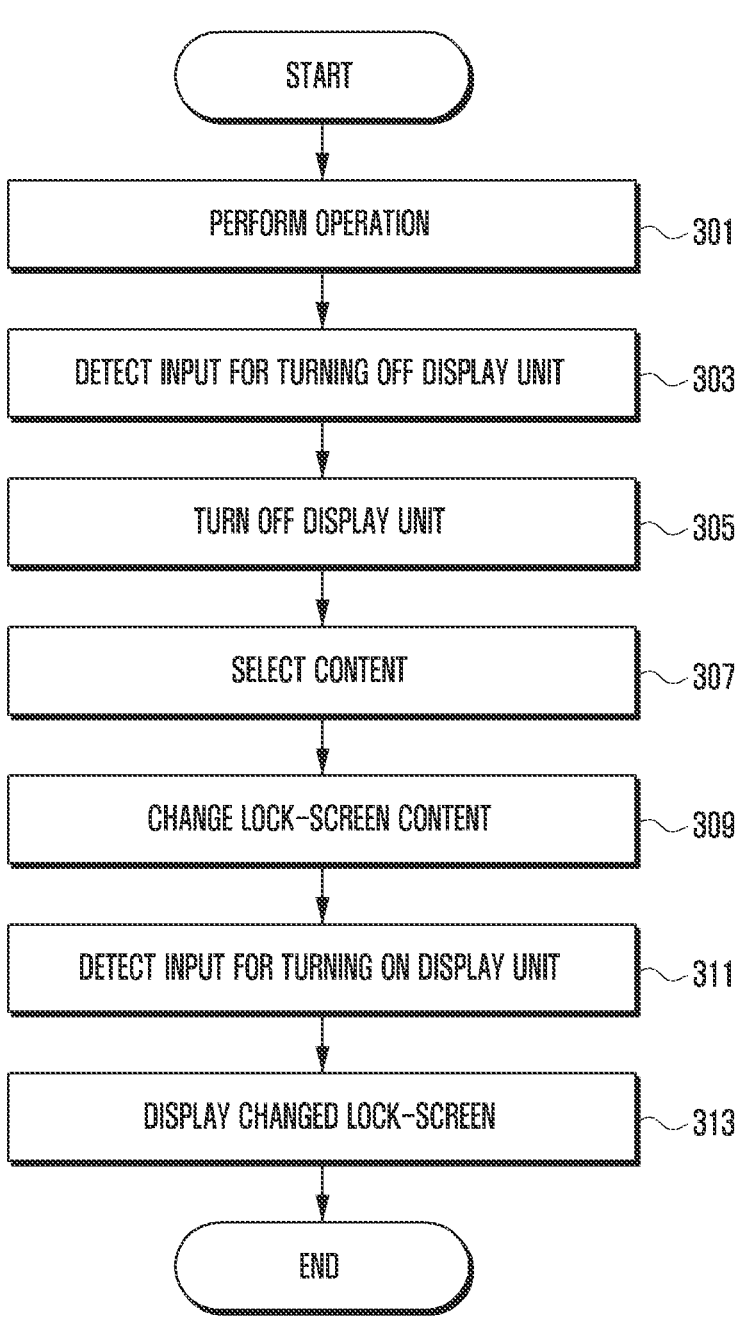
FIG. 3 is a flowchart of an operation of changing a lock-screen in an electronic device according to an embodiment of the present disclosure.

FIG. 3 is a flowchart of an operation of changing a lock-screen in an electronic device according to an embodiment of the present disclosure.

Referring to FIG. 3, in operation 301, the controller 180 may process the execution of a specific operation. For example, the user may use the electronic device 100 while the display unit 131 thereof is turned on, and the controller 180 may process the displaying of the function corresponding thereto and the operation thereof.

In operation 303, the controller 180 may detect the user input for turning off the display unit 131. In operation 305, the controller 180 may turn off the display unit 131 in response to the user input. For example, the user may press the power button 210 while using the electronic device 100 in order to stop using the same. The controller 180 may detect the input of the power button 210 during the execution of a specific function in the on-state of the display unit 131, and may make a control to block the supply of power to the display unit 131 to thereby turn off the display unit 131.

In operation 307, the controller 180 may select the content for changing the lock-screen content, and in operation 309, may change the lock-screen based on the selected lock-screen content. For example, the controller 180 may select new lock-screen content, which is to be displayed when the display unit 131 is turned on, in response to the turning off of the display unit 131, and may change the previous lock-screen content into the selected new content.

In operation 311, the controller 180 may detect the user input for turning on the display unit 131. For example, the user may press the power button 210 in order to use the electronic device 100.

In operation 313, the controller 180 may control the displaying of the changed lock-screen in response to the input for turning on the display unit 131. For example, when the controller 180 detects the input of the power button 210 while the display unit 131 is in the off-state, the controller 180 may make a control to supply the power to the display unit 131 and to display the lock-screen which has been changed into the new content on the display unit 131.

FIG. 4 is a diagram illustrating an operation of changing a lock-screen in an electronic device according to an embodiment of the present disclosure.

Referring to FIG. 4, in the lock-screen changing method according to an embodiment of the present disclosure, the lock-screen of the electronic device 100 may be configured as the new content to be displayed in response to the interaction input of the user using the power button 210 of the electronic device 100 while the display unit 131 is in the off-state, as shown in diagrams 401 to 409. In the embodiment of the present disclosure, the interaction may be defined by a combination of the power button 210, the volume button 230, the home button 250, or other buttons (not shown) while the display unit 131 is turned off, as set forth above, and when the display unit 131 is turned on, the lock-screen may be dynamically changed to correspond to the interaction to be thereby displayed. According to an embodiment of the present disclosure, the electronic device 100, while the display unit 131 is in the on-state, may turn off the display unit 131 in response to the user input of the power button 210, and when the display unit 131 is turned off, the electronic device 100 may pre-configure the lock-screen to be displayed when the display unit 131 is turned on again, based on the new content. The electronic device 100, while the display unit 131 is in the off-state, may turn on the display unit 131 according to the defined user interaction using at least one of the buttons, and may make a control to display the pre-configured lock-screen when the display unit 131 is turned on.

Referring to FIG. 4, whenever the display unit 131 of the electronic device 100 is converted from the off-state (e.g., diagrams 403 and 407) into the on-state (e.g., diagrams 401, 405, and 409) in response to the user interaction, the lock-screen may be provided through the new content (e.g., a first content 410, a second content 430, and a third content 450).

As set forth above, according to the embodiment of the present disclosure, in addition to the function of the power button 210 to turn on/off the display unit 131 of the electronic device 100, it may be identified whether the user input is the user interaction for changing the lock-screen or is for executing the original function of the corresponding button, according to the input method using the power button 210, the volume button 230, and the home button 250 while the display unit 131 is in the off-state. In addition, according to the embodiment of the present disclosure, if the user input is determined as the user interaction for changing the lock-screen, the lock-screen may be dynamically changed in a method defined with respect to the corresponding interaction (or button) to be thereby provided.

FIG. 5 is a flowchart of an operation of changing a lock-screen in an electronic device according to an embodiment of the present disclosure.

Referring to FIG. 5, in operation 501, the controller 180 may make a control to turn off the display unit 131 in response to the user input. For example, in order to turn off the display unit 131, the user may press the power button 210 while the electronic device 100 is in use, and then the controller 180 may make a control to turn off the display unit 131 in response to the input of the power button 210.

In operation 503, the controller 180 may select the new content to replace the current content according to the certain interaction. For example, according to an embodiment of the present disclosure, a plurality of interactions may be defined to change the lock-screen by a combination of the buttons, as described above. Thus, the controller 180 may identify the defined interaction and the type of content configured to the corresponding interaction when the display unit 131 is turned off. The controller 180 may separate and select the different content for each interaction according to the determined interaction and the content type configured to the corresponding interaction.

In operation 505, the controller 180 may change the content depending on the interaction. For example, the controller 180 may change the lock-screen content corresponding to the interaction, based on the content selected with respect to each interaction.

In operation 507, the controller 180 may determine whether the interaction input for changing the lock-screen is received. The controller 180 may determine whether the interruption (e.g., the press input) corresponding to the interaction defined for changing the lock-screen is received from at least one button while the display unit 131 is in the power-off state.

In operation 507, if the interaction input is not detected (NO in operation 507), or if the interruption of the button is for the original function thereof, the controller 180 may execute the corresponding function in operation 509. For example, if the interaction input is not received, the controller 180 may determine the gathering period of the content, and may gather the content according to the gathering period, based on various input methods, as described later. In addition, the controller 180 may periodically change the lock-screen content as a background, based on the gathered content. In addition, if the interaction of the button is for the original function thereof, the controller 180 may make a control to execute the function certain in the corresponding button in response to the button input.

If the interaction is detected in operation 507 (YES in operation 507), the controller 180 may determine the type of interaction in operation 511, and may determine whether it is required to gather the content based on the type of the interaction in operation 513. For example, if the interruption is detected from at least one button, the controller 180 may determine whether the interruption of the button corresponds to the interaction defined for changing the lock-screen. If it is determined that the interruption of the button corresponds to the defined interaction, the controller 180 may determine the type of content configured with respect to the corresponding interaction. For example, the controller 180 may determine whether the content configured with respect to the corresponding interaction exists. The controller 180 may determine whether the interaction is executable based on the pre-changed content, or whether the interaction is to be performed based on the gathering of the content in real time, according to the existence of the configured content.

If it is determined that the content is not required to be gathered in operation 513 (NO in operation 513), the controller 180 may configure the lock-screen in response to the interaction in operation 515. For example, according to the content change for each interaction, which is performed when the display unit 131 is turned off, the controller 180 may configure the lock-screen, based on the pre-changed content with respect to the interaction. For example, the controller 180 may change the lock-screen, based on the content.

If it is determined that the content is required to be gathered in operation 513 (YES in operation 513), the controller 180 may perform the operation of gathering the content corresponding to the interaction in operation 517. For example, the controller 180 may collect the content corresponding to the type (or category) of content configured with respect to the interaction from the inside (e.g., the memory 150) of the electronic device 100, or the outside (e.g., a content server, a cloud server, or other electronic devices) thereof.

In operation 519, the controller 180 may configure the lock-screen, based on the gathered content. For example, the controller 180 may change the lock-screen, based on the gathered content.

In operation 521, the controller 180 may control to turn on the display unit 131. For example, when the changing of the lock-screen is completed in operation 515 or operation 519, the controller 180 may supply the power to the display unit 131 to be turned on.

In operation 523, the controller 180 may make a control to display the changed lock-screen in response to the turning on of the display unit 131.

FIG. 6 is a diagram illustrating an operation of changing a lock-screen in an electronic device according to an embodiment of the present disclosure.

Referring to FIG. 6, in changing the lock-screen according to an embodiment of the present disclosure, as shown in diagrams 601 to 605, the lock-screen of the electronic device 100 may be changed into the new content to be then displayed in response to the type of interaction that is input by the user using the power button 210 while the display unit 131 is in the off-state. In the embodiment of the present disclosure, the interaction may be defined according to a combination of the power button 210, the volume button 230, the home button 250, and other buttons (not shown) while the display unit 131 is in the off-state, and when the display unit 131 is turned on again, the lock-screen may be dynamically changed according to the corresponding interaction to be thereby displayed.

According to the embodiment of the present disclosure, the electronic device 100 may configure the lock-screen, based on at least one of the lock-screen configuration at the time of turning off the display unit 131, or the lock-screen configuration at the time of turning on the display unit 131, and may make a control to display the lock-screen changed and configured based on the pre-changed and configured lock-screen at the time of turning off the display unit 131 (or in a period that is configured during a standby mode in the off-state), or the content gathered at the time of turning on the display unit 131, according to the type of input interaction.

Referring to FIG. 6, when the display unit 131 of the electronic device 100 is converted from the off-state (e.g., diagram 603) into the on-state (e.g., diagram 601) in response to the user interaction (e.g., a short press on the power button 210), the lock-screen may be provided through the pre-changed content (e.g., a first content 610) according to the type of content that is configured with respect to the interaction of the short press of the power button 210.

In addition, when the display unit 131 of the electronic device 100 is converted from the off-state (e.g., diagram 603) into the on-state (e.g., diagram 605) in response to the user interaction (e.g., a long press on the power button 210), the content may be gathered according to the content type configured to correspond to the interaction of the long press on the power button 210, and the lock-screen may be provided using the gathered content (e.g., a second content 630). For example, as described above, if the content type corresponding to the interaction of the long press on the power button 210 is the content based on health information collected from a wearable device 600, the electronic device 100 may collect the health information (e.g., the second content 630) on the user from the wearable device 600 that is in the communication or that is connected through an communication connection operation, in response to the interaction. The electronic device 100 may change and configure the lock-screen, based on the collected heal information (the second content 630). In addition, the electronic device 100 may make a control to display the lock-screen based on the health information (e.g., the second information) when turning on the display unit 131.

FIGS. 7A and 7B illustrate a lock-screen changing method and an operation of changing a lock-screen according thereto in an electronic device according to an embodiment of the present disclosure.

Referring to FIGS. 7A and 7B, according to an embodiment of the present disclosure, the changing of the lock-screen may be supported based on various policies. For example, the lock-screen changing method 700, according to the embodiment of the present disclosure, may be divided into a toggle method 710 and an interaction type-based changing method 750, and the toggle method 710 and the interaction type-based changing method 750 may be separated to be disclosed according to the operation of turning off the display unit 131 at operations 711 and 751, or the operation of turning on the display unit 131 at operations 731 and 771.

In various embodiments of the present disclosure, the toggle method 710 may be a method in which the content of the lock-screen is changed (e.g., toggled) to be provided in response to the user interaction according to the turning off or the turning on of the display unit 131. For example, the toggle method 710 may be a method that operates in the same manner as FIG. 4 as set forth above. In various embodiments of the present disclosure, the interaction type-based changing method 750 may be a method in which the type of user interaction (or input button) is determined in response to the user interaction according to the turning off or the turning on of the display unit 131, and the content of the lock-screen is changed to be provided corresponding to the user interaction based on the determination result. For example, the interaction type-based changing method 750 may be a method that operates in the same manner as FIG. 6 as set forth above. In various embodiments of the present disclosure, the electronic device 100 may operate in one of the toggle method 710 or the interaction type-based changing method 750, or in a combination thereof, according to the configuration thereof. For example, this may be conducted in various ways according to the button by which the interaction is detected.

The example of the operation of changing the lock-screen when the display unit 131 is turned off at operation 711 in the toggle method 710 will be shown below.

As shown in operations following the operation 711 in FIG. 7A, when the display unit 131 is turned off at operation 713 in response to the user input (or when the standby time for maintaining the on-state of the display unit 131 in the electronic device 100 expires), the controller 180 may gather the content according to a certain reference at operation 715. The controller 180 may configure the lock-screen, based on the gathered content at operation 717. For example, the controller 180 may perform the operation of changing the lock-screen as a background, based on at least some of the gathered content. The operation of gathering the content according to a certain reference in the embodiment of the present disclosure will be described later.

The controller 180 may turn on the display unit 131 in response to the user interaction for turning on the display unit 131 at operation 719. The controller 180 may control the displaying of the changed lock-screen when turning on the display unit 131 at operation 721. For example, the controller 180 may make a control to display the changed content different from the previous content in the lock-screen.

Now, the operation of changing the lock-screen when turning on the display unit 131 at operation 731 in the toggle method 710 will be described.

As shown in operations following the operation 731 in FIG. 7A, when the user input for turning on the display unit 131 is detected at operation 733, the controller 180 may gather the content according to a certain reference at operation 735. The controller 180 may configure the lock-screen, based on the gathered content at operation 737. For example, the controller 180 may perform the operation of changing the lock-screen as a background, based on at least some of the gathered content.

The controller 180 may turn on the display unit 131 in response to the completion of changing the lock-screen at operation 739. The controller 180 may control the displaying of the changed lock-screen when turning on the display unit 131 at operation 741. For example, the controller 180 may make a control to display the changed content different from the previous content in the lock-screen.

The example of the operation of changing the lock-screen when the display unit 131 is turned off at operation 751 in the interaction type-based changing method 750 will be shown below.

As shown in operations following the operation 751 in FIG. 7B, when the display unit 131 is turned off at operation 753 in response to the user input (or when the standby time for maintaining the on-state of the display unit 131 in the electronic device 100 expires), the controller 180 may gather the content for each of the certain interactions according to a certain reference at operation 755. For example, according to various embodiments of the present disclosure, different content may be configured with respect to each of the certain interactions. More specifically, the first type of content may be configured with respect to the first interaction, and the second type of content and the third type of content may be configured with respect to the second interaction and the third interaction, respectively. The controller 180 may gather the content corresponding to the type of content configured to each interaction. The controller 180 may configure the lock-screen for each interaction, based on the gathered content at operation 757. For example, the controller 180 may change the lock-screen depending on the interactions, based on at least some of the gathered content for each interaction.

When the user interaction is detected based on at least one button at operation 759, the controller 180 may determine the type of user interaction at operation 761. For example, the controller 180 may identify the type of user interaction, based on at least some of the power button 210, the volume button 230, and the home button 250 of the electronic device 100 that detects the user interaction. In the embodiment of the present disclosure, the user interaction based on at least one button in the off-state of the display unit 131 may include the input for turning on the display unit 131.

The controller 180 may invoke the lock-screen corresponding to the determined type of user interaction at operation 763. For example, the controller 180 may perform a series of operations of retrieving and invoking the lock-screen, which is configured based on at least some of the content mapped with the corresponding user interaction and managed by (stored in) the memory 150, as a background.

The controller 180 may turn on the display unit 131 in response to the user interaction at operation 765. The controller 180 may control the displaying of the changed lock-screen when turning on the display unit 131 at operation 767. For example, the controller 180 may make a control to display the changed content different from the previous content in the lock-screen.

The example of the operation of changing the lock-screen when the display unit 131 is turned on at operation 771 in the interaction type-based changing method 750 will be shown below.

As shown in operations following the operation 771 in FIG. 7B, when the user input for turning on the display unit 131 (e.g., the interaction input based on at least one button in the off-state of the display unit 131) is detected at operation 773, the controller 180 may determine the type of user interaction at operation 775. For example, the controller 180 may identify the type of user interaction, based on at least some of the power button 210, the volume button 230, and the home button 250 of the electronic device 100 that detects the user interaction.

The controller 180 may gather the content configured according to the type of user interaction at operation 777. For example, according to various embodiments of the present disclosure, different content may be configured with respect to each of the certain interactions. More specifically, the first type of content may be configured with respect to the first interaction, and the second type of content and the third type of content may be configured with respect to the second interaction and the third interaction, respectively. The controller 180 may gather the content in a type corresponding to the interaction from the inside or the outside (e.g., the server, or other electronic devices) of the electronic device 100.

The controller 180 may configure the lock-screen, based on the gathered content corresponding to the user interaction at operation 779. For example, the controller 180 may change the lock-screen as a background, based on at least some of the gathered content.

The controller 180 may turn on the display unit 131 in response to the completion of changing the lock-screen at operation 781. The controller 180 may control the displaying of the changed lock-screen when turning on the display unit 131 at operation 783. For example, the controller 180 may make a control to display the changed content different from the previous content in the lock-screen.

FIG. 8 is a diagram illustrating an operation of a lock-screen in an electronic device according to an embodiment of the present disclosure.

Referring to FIG. 8, in various embodiments of the present disclosure, the electronic device 100 may support the changing of the lock-screen through the simple-operation-based user interaction. The user may input a certain user interaction (e.g., a press, a double press, a long press, and the like), based on at least one button of the electronic device 100 as shown in operation 801. The electronic device 100 may provide the lock-screen that varies with the user interaction, as set forth above. For example, the electronic device 100 may change the lock-screen content every time, based on the user interaction, and may provide the same to the user, as shown in operation 831. In various embodiments of the present disclosure, the electronic device 100 may perform the operation of changing the lock-screen, based on at least one event for turning on or turning off the display unit 131.

According to an embodiment of the present disclosure, the electronic device 100 may collect (obtain) the content for the lock-screen in the gathering operation. For example, the electronic device 100 may collect the content from various content sources 810 as operation 833. In various embodiments of the present disclosure, the content sources 810 may include the content 811 that is stored in an electronic device of another user (e.g., a friend) according to his or her experiences, the content 813 that is created by the user and stored in the electronic device 100 (e.g., the memory 150), the content 815 based on various pieces of feed information (e.g., SNS feed information) provided from various servers, the content 817 that can be created based on the search through the Internet, the content 819 based on apps that can be provided or created according to the app promotion, and the like. In the embodiment of the present disclosure, various pieces of content for the lock-screen may be collected (obtained) dynamically, periodically, or according to the event, depending on the user's configuration.

Additionally or alternatively, according to an embodiment of the present disclosure, various functions may be supported based on the content for the lock-screen.

For example, as operation 851, a function to configure the current lock-screen (or the lock-screen content) as the background of the electronic device 100 may be provided. According to an embodiment of the present disclosure, the electronic device 100 may capture the lock-screen to create an image for the background in response to the user input for setting the lock-screen as the background, and may configure the created image as the background.

In addition, as operation 853, the electronic device 100 may support a function for a direct connection, based on the link included in the content of the lock-screen. For example, in various embodiments of the present disclosure, the links 870, which can be included in the content, may be implemented to connect to or execute a specific web 871, a movie sharing site 873 (e.g., YouTube), a content reproduction 875 (e.g., movies), or a specific app 877.

In addition, as operation 855, the electronic device 100 may support a function of sharing the current lock-screen (or the lock-screen content) with other users.

FIG. 9 is a diagram illustrating a configuration operation for gathering content in an electronic device according to an embodiment of the present disclosure.

Referring to FIG. 9, the user may display a configuration interface for configuring the lock-screen through the lock-screen setup menu. In the embodiment of the present disclosure, the configuration interface may include a function configuration item 910 for configuring activation/deactivation (or On/Off) of the function for changing the lock-screen, and gathering object items 930 for indicating the type of content to be gathered.

In the embodiment of the present disclosure, the gathering object items 930 may be preliminarily provided according to the pre-configuration of the electronic device 100, and the gathering object items may be added or deleted according to the user's configuration. For example, the user may configure the type of content (the type of content to be gathered) to be used in changing the lock-screen, and the gathering object items in a content type corresponding to the user's configuration may be displayed in the configuration interface. In the embodiment of the present disclosure, the editing, such as adding or deleting the gathering object items, may be conducted through a gathering configuration item 935. For example, the user may select the gathering configuration item 935, and the electronic device 100 may display the configuration interface including a content list (or a content-type list) for configuring the gathering object items 930 in response to the selection of the gathering configuration item 935. The user may configure the gathering object items by selecting at least one item of the content (or the content type) in the configuration interface, and completing the configuration.

In the embodiment of the present disclosure, the configurable gathering object content (or content type) may be divided into the personal content, the SNS feeding content, the web-based searching content (the web surfing content), the linkage content, or the app content that can be provided or created according to the web promotion.

In the embodiment of the present disclosure, the personal content may include various pieces of content that is stored in the memory 150 of the electronic device 100, an external memory and/or an external server (e.g., the cloud server), and that is created or designated by the user. For example, the personal content may include image content, video content, music content, and the like. In the embodiment of the present disclosure, the personal content may be stored in the form of a thumbnail or a link.

The SNS feeding content may include various pieces of content provided from at least one SNS that the user uses through the electronic device 100. For example, in using the electronic device 100, the user may register (install) at least one SNS application (app) to be used in the electronic device 100, and may perform the user authentication (e.g., logging-on) in the corresponding SNS. Afterwards, the user or the electronic device 100 may receive and store various pieces of content (e.g., content uniform/universal resource locator (URLs), images, emoticons, news information, and the like) provided from the corresponding SNS server through the SNS application.

The web surfing content may include the content (e.g., web interest content) searched for, based on keywords input (configured) as the things the user is interested in, or the content, such as a specific web page that is designated to be downloaded or clipped by the user through searching using a browser, images, text, or links. In the embodiment of the present disclosure, the content searched for based on the keyword may be obtained by web-crawling the content corresponding to the keyword from among various pieces of content, such as images, or text, which are distributed over the web, using the corresponding keyword.

The linkage content may include the content that is obtained through interworking between the electronic device 100 and external electronic devices (e.g., the wearable device). For example, the electronic device 100 may collect health information from the user's wearable device that is in communication, or is connected through the communication connection operation. In the embodiment of the present disclosure, the health information obtained from the wearable device may be provided in the form of text or a widget in the lock-screen. In addition, in the embodiment of the present disclosure, the linkage content may include the shared lock-screen (or lock-screen content) transferred from another user.

The app content may include the content, such as advertisement images in association with an advertisement server, app-related images, or app links.

In the embodiment of the present disclosure, various pieces of content for the lock-screen may be collected (obtained) dynamically, periodically, or according to a certain event, depending on the configuration of the user or the electronic device 100. In addition, in the embodiment of the present disclosure, the content in a specific type (e.g., the image content) may be automatically changed to conform to the form of the lock-screen provided in the electronic device 100, to be then provided. For example, the image in the horizontal shape may be cropped (e.g., trimming unnecessary portion of the image) to conform to the vertical shape of the lock-screen, and may be then stored.

As described above, the gathered content, according to the embodiment of the present disclosure, may be stored in the form of an image, a movie, text, or meta-data. For example, the images or the movies may include images downloaded through a local server, a cloud server, a web server, or the SNS, and the text may include the text related to the corresponding content (e.g., titles or messages). The meta-data may include an actual content link (e.g., in the case of a movie thumbnail, the information to be configured to reproduce the movie when clicking on the image in the lock-screen) of the corresponding content.

FIG. 10 is a diagram illustrating a lock-screen implemented in an electronic device according to an embodiment of the present disclosure.

Referring to FIG. 10, an example of displaying the content in the lock-screen in the electronic device 100 is illustrated, according to an embodiment of the present disclosure. For example, the electronic device 100 may display the lock-screen different from the previous lock-screen, based on at least some of the content gathered in the standby mode (e.g., in the off-state of the display unit 131) when the display unit 131 is turned on. The lock-screen, according to the embodiment of the present disclosure, may display at least one piece of the content, such as an image 1010, information 1030, or a message 1070, based on at least some of the gathered content.

For example, the image 1010, which is gathered dynamically, periodically, or according to a specific event, may be changed by the user interaction.

The information 1030 may be displayed as a combination of various pieces of information, such as time, date, weather, and the like, based on the configuration of the user or the electronic device 100.

A link 1050 may be displayed as an item (e.g., a thumbnail image, text, an icon, and the like) that is able to move, reproduce, or execute the original content in response to the user input (e.g., a tap on the image/text). For example, in the case of the item as a video thumbnail image, the link 1050 may be configured as a link for reproducing the video, in the case of the item as a local image, the link 1050 may execute the gallery, or in the case of the item as an icon/text of the web content or the SNS content, the link 1050 may enable the movement on to the corresponding URL.

The message 1070 may be displayed as text {e.g., short text (text messages, SNS messages, or titles of documents)} related to the gathered content.

In the embodiment of the present disclosure, the content, such as the image 1010, the information 1030, the link 1050, or the message 1070 may be displayed in the area pre-allocated for displaying the corresponding content, or may be displayed in the areas randomly combined according to the type of content or the number of pieces of content, to be thereby displayed in various ways.

FIG. 11 is a diagram illustrating an operation for processing content-gathering in an electronic device according to an embodiment of the present disclosure.

Referring to FIG. 11, the content-gathering, according to various embodiments of the present disclosure, may be conducted based on the configuration of the configuration interface, as described in FIGS. 9 and 10. For example, in operation 1101, the user may set the various gathering object items 930 through the gathering configuration item 935, and the electronic device 100 may configure to gather various pieces of content, based on the gathering object items 930. According to the embodiment of the present disclosure, the user may add or delete the content type that he or she wishes to view in the lock-screen through the configuration function above, and may further perform the logging-on or the keyword input according to the content type.

In operation 1103, the electronic device 100 may gather the content, based on the configuration through the configuration interface, and may store the gathered content in the memory 150. In the embodiment of the present disclosure, the electronic device 100 may gather the content dynamically, periodically, or in response to a specific event according to the user's configuration. In various embodiments of the present disclosure, the controller 180 of the electronic device 100 may gather the content within a threshold value (e.g., 100) according to a certain configuration, and store the gathered content in the memory 150.

In operation 1105, the electronic device 100 may change the lock-screen when the display unit 131 is turned off, based on the gathered content, or may prepare the changed content to thereby change the lock-screen when the display unit 131 is turned on by the actual user interaction (e.g., a button-press through a combination of the buttons). In various embodiments of the present disclosure, the controller 180 of the electronic device 100 may detect the user interaction input based on a combination of at least one button while the display unit 131 is in the off-state, and may select the corresponding content from the memory 150 in response to the user interaction to thereby change the lock-screen. Accordingly, whenever the display unit 131 of the electronic device 100 is turned on, a new changed lock-screen may be displayed.

According to an embodiment of the present disclosure, the user may determine the lock-screen specific times (e.g., 100 times) a day. According to this, in the embodiment of the present disclosure, the electronic device 100 may gather the content dynamically or periodically in order to continue to change the content for the lock-screen, and may store and manage the gathered content in the memory 150 of the electronic device 100.

In addition, according to an embodiment of the present disclosure, the electronic device 100 may stop gathering the content temporarily according to a certain condition, and may resume the content-gathering when a certain condition is satisfied. For example, when the pool size of the gathered content is less than a reference value (e.g., 30) of the lock-screen pool size, which is set for the lock-screen, according to the frequent turning-on/off of the display unit 131 by the user, the content-gathering may be performed. The pool may refer to a temporary space having a certain size, which is allocated in order to store the gathered content in the memory 150 of the electronic device 100.

In addition, according to an embodiment of the present disclosure, the electronic device 100 may gather the content in an order of the gathering object items 930 configured in the configuration interface as shown in FIG. 9, and the sequence of the gathering object items 930 may be altered in various ways by the user.

FIG. 12 is a diagram illustrating an operation of changing a lock-screen based on the lock-screen sharing in an electronic device according to an embodiment of the present disclosure.

Referring to FIG. 12, the example of sharing the lock-screen among a user A (1210), a user B (1230), and a user C (1250) will be described. FIG. 12 shows that the user A (1210) shares the lock-screen created in the electronic device 100 (hereinafter, the first electronic device) with the user B (1230) and the user C (1250).

In operation 1201, the user A (1210) may transmit the lock-screen currently configured (displayed) in the first electronic device to the user B (1230) to thereby change the lock-screen of the electronic device (hereinafter, the second electronic device) of the user B (1230). According to an embodiment of the present disclosure, in order to share the current lock-screen of the first electronic device, the user A (1210) may perform the manipulation, such as selecting the sharing of the current lock-screen, selecting the user with whom the lock-screen is to be shared (e.g., the user B 1230), writing a message (optional), or selecting the transmission, through the lock-screen sharing interface, to thereby change the lock-screen of the second electronic device, based on the current lock-screen.

In addition, according to various embodiments of the present disclosure, the user A (1210) may change the lock-screen of the second electronic device of the user B (1230), using the content stored in the memory 150, or the content created in real time (e.g., instant pictures, instant videos, and the like) as well as the current lock-screen of the first electronic device. For example, the user A (1210) may transmit a photo or a video, which is photographed or taped in real time using the first electronic device, to the second electronic device of the user B (1230) to thereby change the lock-screen of the second electronic device. According to an embodiment of the present disclosure, in order to share the photo, the user A (1210) may perform the manipulation, such as selecting the sharing of the photo, selecting the user with whom the photo is to be shared (e.g., the user B 1230), writing a message (optional), or selecting the transmission, through the lock-screen sharing interface, to thereby change the lock-screen of the second electronic device, based on the photo.

In addition, according to various embodiments of the present disclosure, the user A (1210) may share the web content to be experienced through the first electronic device. For example, in order to share a specific movie while using a movie sharing site (e.g., YouTube) through the first electronic device, the user A (1210) may perform the manipulation, such as selecting the sharing of the content to be experienced (e.g., the movie), selecting the user with whom the photo is to be shared (e.g., the user C 1250), writing a message (optional), or selecting the transmission, through the lock-screen sharing interface, to thereby change the lock-screen of the third electronic device, based on the content to be experienced by the user. Here, the web content may be shared based on the content information to execute or reproduce the corresponding content. For example, the content information may be stored in the form of a thumbnail, text, or a link, which are related to the content (e.g., the movie), to be then transmitted.

In the embodiment of the present disclosure, the operation of changing the lock-screens of other electronic devices (e.g., the second electronic device, or the third electronic device) by the first electronic device may be performed through the transmission of a control message in a defined format, and the control message may include an instruction to execute the changing of the lock-screen, the content (e.g., the lock-screen, photos, content information, and the like), or written messages.

In operation 1203 or in operation 1205, the second electronic device and the third electronic device may receive the control message from the first electronic device. The second electronic device and the third electronic device may display the message written by the user A (1210), and may change the lock-screen automatically or through the user's approval, based on the control message.

In operation 1203, the second electronic device may change the lock-screen of the second electronic device into the lock-screen of the first electronic device or the lock-screen corresponding to the photo in response to the reception of the control message from the first electronic device. In addition, the user B (1230) may selectively restore the changed lock-screen to the previous lock-screen of the second electronic device through the function selection.

In operation 1205, the third electronic device may change the lock-screen of the third electronic device into the lock-screen corresponding to the content information in response to the reception of the control message from the first electronic device. The user C (1250) may execute or reproduce the corresponding content through the user input (e.g., a long tap on the link) configured in the lock-screen.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC chip, FPGAs, and programmable-logic device, which have been known or are to be developed.

At least some of the devices (e.g., modules or functions thereof) or methods (e.g., operations) according to various embodiments of the present disclosure may, for example, be implemented by a command stored in a computer-readable storage medium in the form of a programming module. The command, when executed by one or more processors (e.g., the processor 125), may cause the one or more processors to perform a function corresponding to the command. The computer-readable storage medium may be, for example, the memory 150. At least a part of the programming module may, for example, be implemented (e.g., executed) by the processor 125. At least some of the programming modules may include, for example, a module, a program, a routine, a set of instructions or a process for performing one or more functions.

Meanwhile, according to various embodiments of the present disclosure, the respective modules may be configured with software, firmware, hardware, or combinations thereof. Furthermore, some or all modules may be configured within one entity, in which case the function of the corresponding module may be identically performed. Moreover, according to various embodiments of the present disclosure, respective operations may be executed sequentially, repeatedly, or in parallel. In addition, some operations may be omitted or may be executed while other operations are added thereto.

The various embodiments of the present disclosure as described above may be implemented in the form of a program instruction that can be performed through various computers, and may be recorded in a computer readable recording medium. The computer readable recording medium may include a program command, a data file, and a data structure independently or in combination. The program command recorded in the medium may be things specially designed and configured for the present disclosure, or things that are well known to and can be used by those skilled in the computer software related art.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

As described above, the electronic device and the operation method thereof, according to various embodiments of the present disclosure, can easily change the lock-screen, based on the simple user interaction. According to the embodiment of the present disclosure, a new user interaction can be defined using one of various buttons (e.g., the power button, the volume button, the home button, and the like) adopted in the electronic device or a combination thereof while the original functions of the buttons are maintained, and the changing of the lock-screen can be simply supported based on the defined user interaction so that the user can be provided with a new experience by defining a new user interaction.

According to the embodiment of the present disclosure, the lock-screen of the electronic device, which typically has been provided as a single image, can be configured and provided as various types of lock-screens, and the information that the user frequently determines or requires can be provided through the lock-screen according to the configuration of the electronic device. Accordingly, according to the embodiment of the present disclosure, the user can quickly view the desired information while the lock-screen is dynamically changed according to the user interaction even without frequently releasing the lock-screen. In addition, according to the embodiment of the present disclosure, the lock-screen can be automatically changed and configured as a background when the display unit is turned off, and the changed lock-screen can be automatically provided when the display unit is turned on.

According to various embodiments of the present disclosure, an optimal environment for supporting the lock-screen in the electronic device may be implemented to thereby enhance the usability, the convenience, the accessibility, and the competitiveness of the electronic device as well as the user's convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a display;
a processor operatively coupled to the display; and
memory configured to store instructions and at least one content,
wherein the instructions, when executed individually or collectively by the processor, cause the electronic device to:
receive a user input for setting to display contents of an application in a lock-screen,
gather the contents of the application, while the display is in an off-state,
update an item corresponding to the contents of the application to be displayed in the lock-screen while the display is in the off-state, based on the gathered contents,
receive, while the display is in the off-state, a user interaction for changing a display state, and
display, in response to the user interaction, the item corresponding to the gathered contents of the application in the lock-screen via the display.
2. The electronic device of claim 1, further comprising:
wireless communication circuitry,
wherein the instructions, when executed individually or collectively by the processor, further cause the electronic device to:
automatically gather the contents of the application from an external server or network through the wireless communication circuit according to the user input.
3. The electronic device of claim 2, wherein the instructions, when executed individually or collectively by the processor, further cause the electronic device to:
periodically update the gathered contents.

4. The electronic device of claim 1, wherein the instructions, when executed individually or collectively by the processor, further cause the electronic device to:
gather the contents of the application in response to detection of a specific event set based on the user input.
5. The electronic device of claim 1, wherein the user interaction is combined in one or more of a short press, a long press, or at least two presses based on a plurality of buttons.
6. The electronic device of claim 1, wherein the at least one content comprises at least one of:
personal content,
social networking service (SNS) content available from an SNS service,
web surfing content available from a web site,
linkage content stored on an external device connected to the electronic device by a local area network (LAN), or
app content available from an application stored on the memory.
7. The electronic device of claim 1, wherein the instructions, when executed individually or collectively by the processor, further cause the electronic device to:
stop gathering the contents according to a predetermined condition, and
resume the gathering of the contents when the predetermined condition is satisfied.
8. The electronic device of claim 7, wherein the predetermined condition comprises that a pool size of the gathered contents is less than a reference value set for a lock-screen pool size.
9. The electronic device of claim 8, wherein the pool comprises a temporary space having a predefined size allocated in the memory to store the gathered contents.
10. The electronic device of claim 1, wherein the instructions, when executed individually or collectively by the processor, further cause the electronic device to:
identify a linkage information based on the gathered contents,
generate a link item for moving URL corresponding to the linkage information based on the linkage information, and
display the link item on the lock-screen via the display.
11. The electronic device of claim 1, wherein the instructions, when executed individually or collectively by the processor, further cause the electronic device to:
identify a video thumbnail image based on the gathered contents,
display, in response to identification of the video thumbnail image, a thumbnail item corresponding to the video thumbnail image on the lock-screen via the display, and
reproduce, in response to input of the thumbnail item, a video corresponding to the video thumbnail image.
12. A method for displaying a lock-screen of an electronic device, the method comprising:
receiving a user input for setting to display contents of an application in a lock-screen;
gathering the contents of the application, while the display is in an off-state;
updating an item corresponding to the contents of the application to be displayed in the lock-screen while the display is in the off-state, based on the gathered contents;
receiving, while the display is in the off-state, a user interaction for changing a display state; and displaying, in response to the user interaction, the item corresponding to the gathered contents of the application in the lock-screen via the display.

13. The method of claim 12, further comprising:

automatically gathering the contents of the application from an external server or network through a wireless communication circuit according to the user input; and periodically updating the gathered content.

14. The method of claim 12, further comprising:

gathering the contents of the application in response to detection of a specific event set based on the user input.

15. The method of claim 12, wherein the contents of the application comprise at least one of:

personal content, social networking service (SNS) content available from an SNS service, web surfing content available from a web site, linkage content stored on an external device connected to the electronic device by a local area network (LAN), or app content available from an application stored in a memory.

16. The method of claim 12, further comprising:

stopping gathering the contents according to a predetermined condition; and resuming the gathering of the contents when the predetermined condition is satisfied.

17. The method of claim 16, wherein the predetermined condition comprises that a pool size of the gathered contents is less than a reference value set for a lock-screen pool size, and wherein the pool comprises a temporary space having a predefined size allocated in a memory to store the gathered contents.

18. The method of claim 16, further comprising:

identifying a linkage information based on the gathered contents;

generating a link item for moving URL corresponding to the linkage information based on the linkage information; and displaying the link item on the lock-screen via the display.

19. The method of claim 12, further comprising:

identifying a video thumbnail image based on the gathered contents;

displaying, in response to identification of the video thumbnail image, a thumbnail item corresponding to the video thumbnail image on the lock-screen via the display; and reproducing, in response to input of the thumbnail item, a video corresponding to the video thumbnail image.

20. One or more non-transitory computer-readable storage media storing one or more computer programs including computer-executable instructions that, when executed by one or more processors of an electronic device, cause the electronic device to perform operations, the operations comprising:

receiving a user input for setting to display contents of an application in a lock-screen;

gathering the contents of the application, while the display is in an off-state;

updating an item corresponding to the contents of the application to be displayed in the lock-screen while the display is in the off-state, based on the gathered contents;

receiving, while the display is in the off-state, a user interaction for changing a display state; and displaying, in response to the user interaction, the item corresponding to the gathered contents of the application in the lock-screen via the display.

* * * * *